Nov. 30, 1954

A. W. HARZ 2,695,812

AMBULANT TREE SPRAYING APPARATUS

Filed April 4, 1951

Inventor

Albert W. Harz

By Munn Khare.

Attorney

Inventor
Albert W. Harz
By Mason H. ...
Attorney

AMBULANT TREE SPRAYING APPARATUS

Filed April 4, 1951 19 Sheets-Sheet 3

Inventor
Albert W. Harz
By Munn & Hare
Attorney

Nov. 30, 1954

A. W. HARZ 2,695,812

AMBULANT TREE SPRAYING APPARATUS

Filed April 4, 1951

Inventor

Albert W. Harz

By [signature]

Attorney

AMBULANT TREE SPRAYING APPARATUS

Filed April 4, 1951

Inventor

Albert W. Harz

By Munn [illegible]

Attorney

Inventor
Albert W. Harz
By Munson H. Lane
Attorney

Inventor
Albert W. Harz
By Munn & Harr
Attorney

Nov. 30, 1954 A. W. HARZ 2,695,812

AMBULANT TREE SPRAYING APPARATUS

Filed April 4, 1951 19 Sheets-Sheet 8

INVENTOR.

Albert W. Harz

BY

Munn Liddy & Glaccum

ATTORNEY

Nov. 30, 1954 A. W. HARZ 2,695,812

AMBULANT TREE SPRAYING APPARATUS

Filed April 4, 1951 19 Sheets-Sheet 9

INVENTOR.
Albert W. Harz
BY
Munn [signature]
ATTORNEY

INVENTOR.
Albert W. Harz
BY
Munson H. Lane
ATTORNEY

AMBULANT TREE SPRAYING APPARATUS

Filed April 4, 1951 19 Sheets-Sheet 11

INVENTOR.
Albert W. Harz
BY
Munson H. Kane
ATTORNEY

Inventor
Albert W. Harz
By Munn Kbar
Attorney

Inventor
Albert W. Harz
By [signature]
Attorney

Nov. 30, 1954 A. W. HARZ 2,695,812

AMBULANT TREE SPRAYING APPARATUS

Filed April 4, 1951 19 Sheets-Sheet 14

Inventor

Albert W. Harz

By Merrill Whare.

Attorney

Nov. 30, 1954 A. W. HARZ 2,695,812

AMBULANT TREE SPRAYING APPARATUS

Filed April 4, 1951 19 Sheets-Sheet 15

Inventor

Albert W. Harz

By [signature]

Attorney

Nov. 30, 1954

A. W. HARZ 2,695,812

AMBULANT TREE SPRAYING APPARATUS

Filed April 4, 1951

INVENTOR
Albert W. Harz,

BY Munson H. Lane

ATTORNEY

Nov. 30, 1954 A. W. HARZ 2,695,812

AMBULANT TREE SPRAYING APPARATUS

Filed April 4, 1951 19 Sheets-Sheet 17

INVENTOR

Albert. W. Harz

BY Munn & Hare

ATTORNEY

Nov. 30, 1954

A. W. HARZ 2,695,812

AMBULANT TREE SPRAYING APPARATUS

Filed April 4, 1951

INVENTOR

Albert W. Harz

BY Munn & Harz

ATTORNEY

INVENTOR
Albert W. Harz
BY Munson H. Lane.
ATTORNEY

Nov. 30, 1954 — A. W. HARZ — 2,695,812
AMBULANT TREE SPRAYING APPARATUS
Filed April 4, 1951 — 19 Sheets-Sheet 19

INVENTOR
Albert W. Harz
BY
ATTORNEY

United States Patent Office 2,695,812

Patented Nov. 30, 1954

2,695,812

AMBULANT TREE SPRAYING APPARATUS

Albert W. Harz, Orlando, Fla.

Application April 4, 1951, Serial No. 219,256

40 Claims. (Cl. 299—37)

This invention relates to ambulant sprayers of the spray boom type for spraying trees or various kinds of plants or growing vegetation, and has special reference to sprayers in which the liquid or solution to be sprayed is contained within a storage tank suitably mounted with the boom for travel over the ground and in which the spray liquid or solution is delivered by a suitable pumping mechanism under high pressure to the spray boom for discharge in the form of spray against the growing vegetation.

The present application is a continuation-in-part of my prior application Serial No. 663,081, filed April 18, 1946, and of my earlier application Serial No. 566,214, filed December 1, 1944, now abandoned, relating to improvements in sprayers of this character.

It has heretofore been a practice to employ horizontal spray booms arranged to travel at a level more or less high above the ground to spray vegetables or like growing crops, such booms having nozzles positioned below the boom and spray pipe to discharge a spray solution downwardly on the crop. It has also heretofore been a practice to employ vertical spray booms or other spraying apparatus for spraying fruit or other trees from a traveling vehicle at different horizontal levels or at a more or less high level from which the spray is discharged horizontally or upwardly or downwardly. It has also been a practice to employ sprayers handled by operators walking along the ground and alongside a spraying machine to discharge spray horizontally or at different angles against trees. So far as I am aware, however, no sprayers mounted for horizontal travel beneath the limbs of trees and having longitudinally spaced nozzles protected by suitable guard means and arranged to direct the spray upwardly through and between the limbs of trees have ever, prior to my invention, been employed. The disadvantage of spraying trees from a traveling vehicle at a high level or by the use of sprayers carried by operators walking on the ground, however, is that the lower branches of the trees cannot be reached or adequately sprayed or sprayed to any efficient degree without drenching operations, causing waste of spray. Because of this fact, and by reason of the use of sprayers carried by operators walking on the ground in an attempt to overcome this objection, the amount of spray used is excessive and the operation of spraying many trees of an orchard, for example, is time consuming, laborious and expensive.

One object of my invention is to provide an elongated spray boom construction which overcomes these objections and wherein the boom is mounted to travel horizontally on or in close proximity to the ground and beneath the lowest lying limbs of trees, and has its nozzles spaced longitudinally and arranged to direct the spray upwardly so that all limbs of the tree may be reached and thoroughly sprayed.

Another object of the invention is to provide a spray boom which will pass over a cover crop and move the same without injury thereto out of the path of the boom and thereafter permit the crop to return to its normal upright position, and to provide a spray boom which will lift the low lying limbs of trees off the ground or to a suitable elevation above the ground and spread the limbs to allow the discharging spray to cover such limbs and to pass upwardly for an effectual spraying of the higher limbs of the trees.

Still another object of my invention is to provide a spray boom construction which embodies novel guarding or shielding means to protect the nozzles from injury while allowing contact of the boom with low lying and other limbs or branches of the plants for the purpose of bringing the same into the spray zone or field of the boom without interference with the spraying action of the nozzles carried by the boom.

Another object of the invention is to provide a spray boom construction which is designed to travel close to the ground and to raise the low lying limbs or branches of trees or plants and free the same from other growing vegetation and spread the portions thereof so that such portions of the trees or plants may be effectually sprayed.

Still another object of the invention is to provide a spray boom having means for pushing down the cover crop ahead of the spray nozzles so that the discharging spray may freely reach the tree foliage without interference from the growing vegetation, which means will pass over the cover crop without causing injury thereto so as to allow the crop to regain its normal upright position after spraying of the low lying parts of the tree foliage has been accomplished.

Still another object of the invention is to provide a sprayer in which the spray boom is underslung or disposed at a low level on a carrier vehicle for travel on or in close proximity to the ground surface and so as to adjust or adapt itself to varying levels in the ground surface, and in which the spray boom is operative for discharging the spray horizontally, vertically, or at various angles between the vertical and horizontal in order that the spray may be discharged in a manner best suited to thoroughly cover all portions of the branches of trees or growing vegetation.

Still another object of the invention is to provide a boom construction which dispenses with the use of walking operators to spray the trees manually and in which all controls for operating the boom and the carrier vehicle are preferably placed within the reach of the driver of the vehicle, thus effecting a reduction in the number of operators required and a material saving in the cost of operating the machine.

Still another object of the invention is to provide a low or underslung spray boom in which the spray pipe and nozzles are at least partially enclosed and covered by a guard or shield serving to protect such spray elements at bottom and top from injury while serving to lift low branches of trees or other plants in order to adapt the same to be efficiently sprayed.

Still another object of the invention is to provide a spray boom embodying a novel form and construction of guard and construction and arrangement of spraying means therein, including an oscillatable sprayer and guard movable to different spraying positions or to spray throughout a given arc, whereby the strength of the boom and its working efficiency for different spraying actions are materially increased as compared with spray booms of the types heretofore in use.

Still another object of the invention is to provide a spray boom which is mounted on a tank carrying vehicle so as to be movable from a horizontal working position, in which it projects laterally at one side of the vehicle, to a vertical inoperative position so that the apparatus when not in use or being transported from place to place may travel with the boom in a position in which it is not liable to be injured, and which also adapts the apparatus to be transported, parked or stored in a comparatively small space.

Still another object of the invention is to provide a spray boom which is adjustable to work at different levels on a carrier vehicle or to suit frame structures of different carrier vehicles, and to have vertical movement so as to ride without injury over stones or other ordinary ground obstructions.

Still another object of the invention is to provide a spray boom which may be allowed to swing free on encountering an obstruction which it cannot freely pass in order to prevent damage to the boom or any of its parts.

Still another object of the invention is to provide a spray boom of the construction described which may be mounted vertically on a carrier vehicle for use in connection with a horizontally mounted boom and whose spray pipe may be operated and oscillated, if desired, in unison with the spray pipe of the horizontal boom.

Still another object of the invention is to provide a spray boom which is simple of construction, reliable and efficient in operation, capable of ready application to different carrier vehicles, and adapted to be easily kept in working order and manufactured and sold at a comparatively low cost.

Still another and particular object of the present invention is to provide a spray bar or boom in which a spray pipe forms the body of the boom and in which guarding or shielding means which protects the nozzles from injury comprises shield members or plates welded or otherwise secured to the pipe.

Still another object of the invention is to provide a novel arrangement of nozzles whereby the trunks of trees as well as the limbs thereof may be effectively sprayed.

Still another object of the invention is to provide means for mounting the boom which permits relative vertical motion between the vehicle and boom to prevent injury to the boom or its connections in the event of either the wheels of the vehicle or the boom dropping into a hole, ditch or depression in the ground.

Still another object of the invention is to provide the boom with means for preventing undue spreading of the spray as it leaves the nozzles so as to increase its trajectory range and prevent waste of spray in the region of the boom, and also to provide means for extending the length of the boom when desired or required.

Still another object is to provide fender means for fending grass or other vegetable growth away from the nozzles and associated means for holding the boom in working position and allowing its release to prevent injury thereto when encountering an obstruction.

Still another object of the invention is to provide novel means for mounting the boom to swing horizontally when encountering an obstruction to prevent injury thereto, which means will automatically maintain the boom in a normal working position and is adjustable to vary this position relatively to the carrier vehicle.

Still another object of the invention is to provide means for supporting the boom which permits the boom to move upward when encountering an obstruction and to pass over the obstruction without injury, and which, as soon as the boom passes the obstruction, will automatically allow the boom to return to its working position.

Other objects will be apparent from a consideration of the accompanying drawings and the following detailed description, in which are set forth by way of illustration rather than by way of limitation various specific embodiments of my invention.

Figures 30, 31, 32, 33, 34:
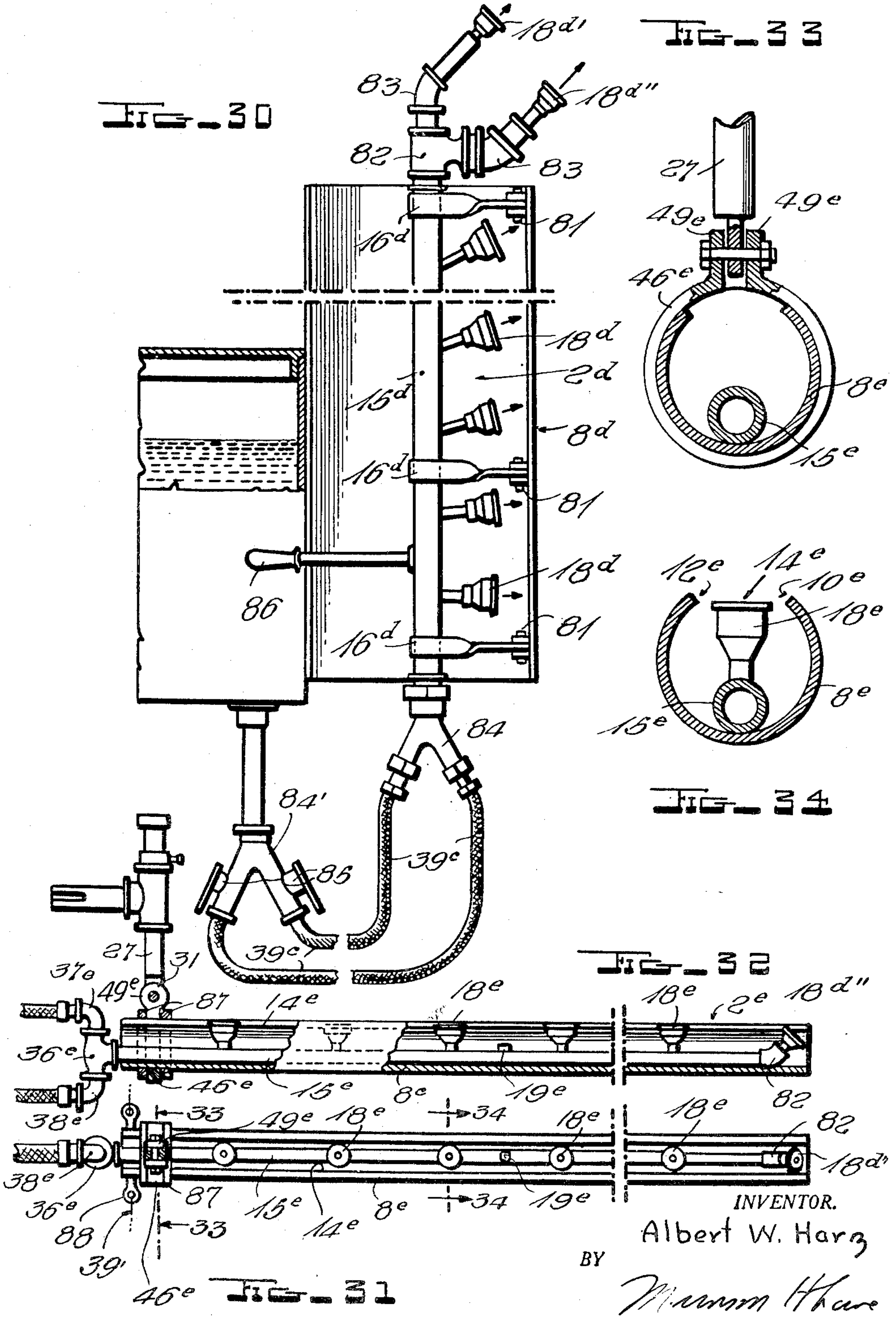
Fig. 30 is a view showing a modified construction of vertical spray boom.
Fig. 31 is a plan view, partially in section, on the line 31—31 of Fig. 32, and Fig. 32 a longitudinal sectional view of a still further modified construction of horizontal spray boom.
Figures 35, 36, 37, 38, 39, 40, 41, 42, 43, 44, 45, 46:
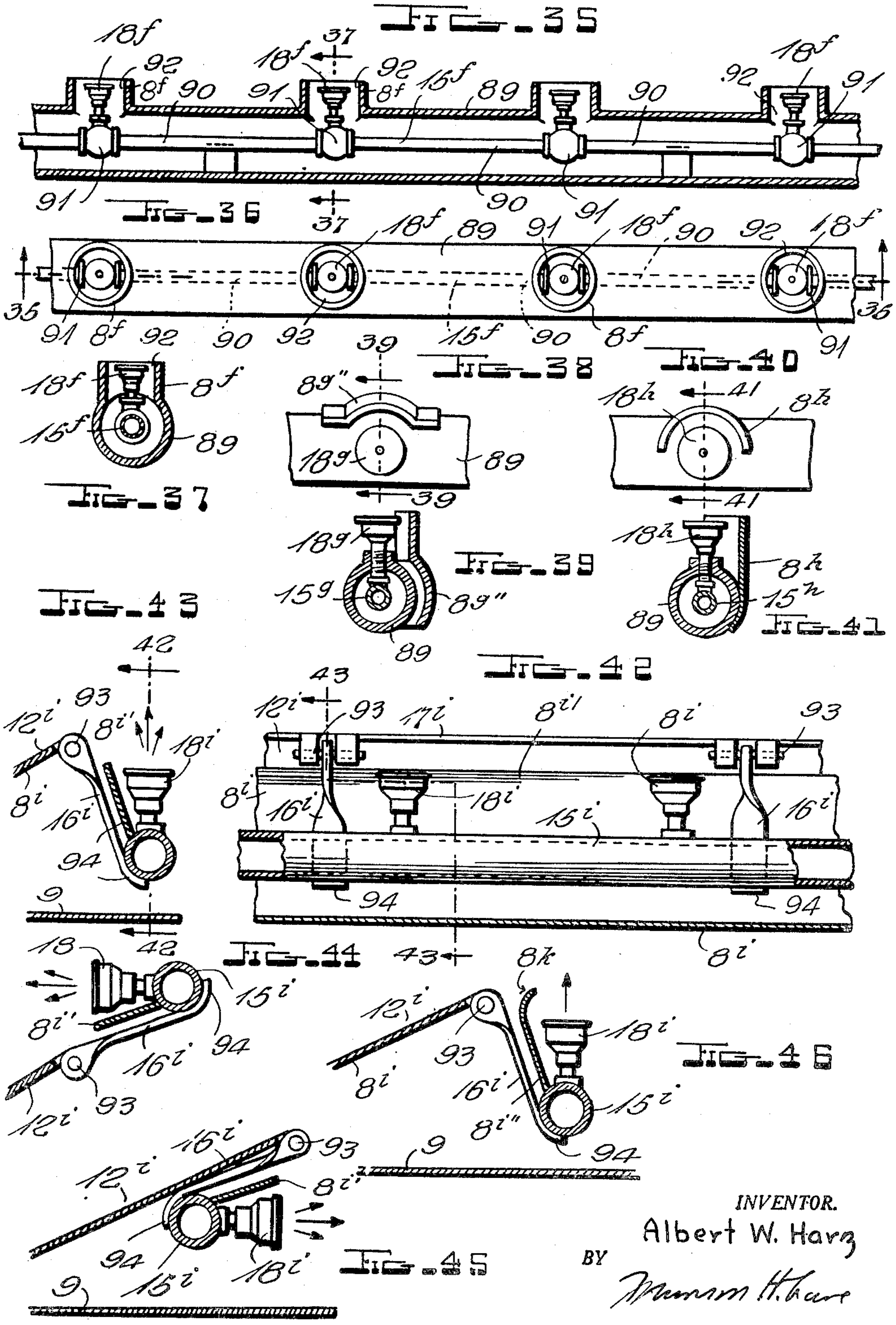
Figures 47, 48, 48A, 48B:
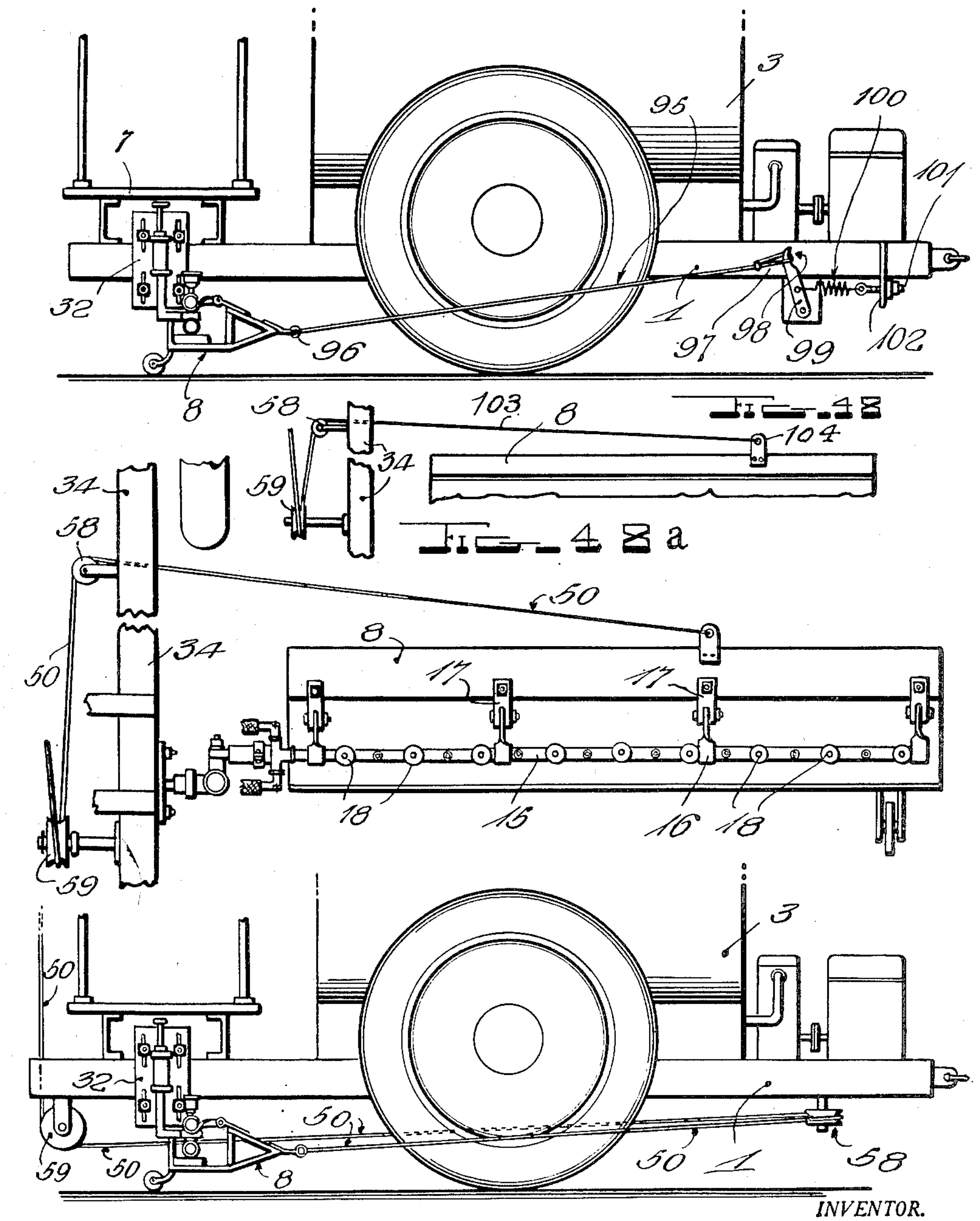
Figures 49, 50, 51:
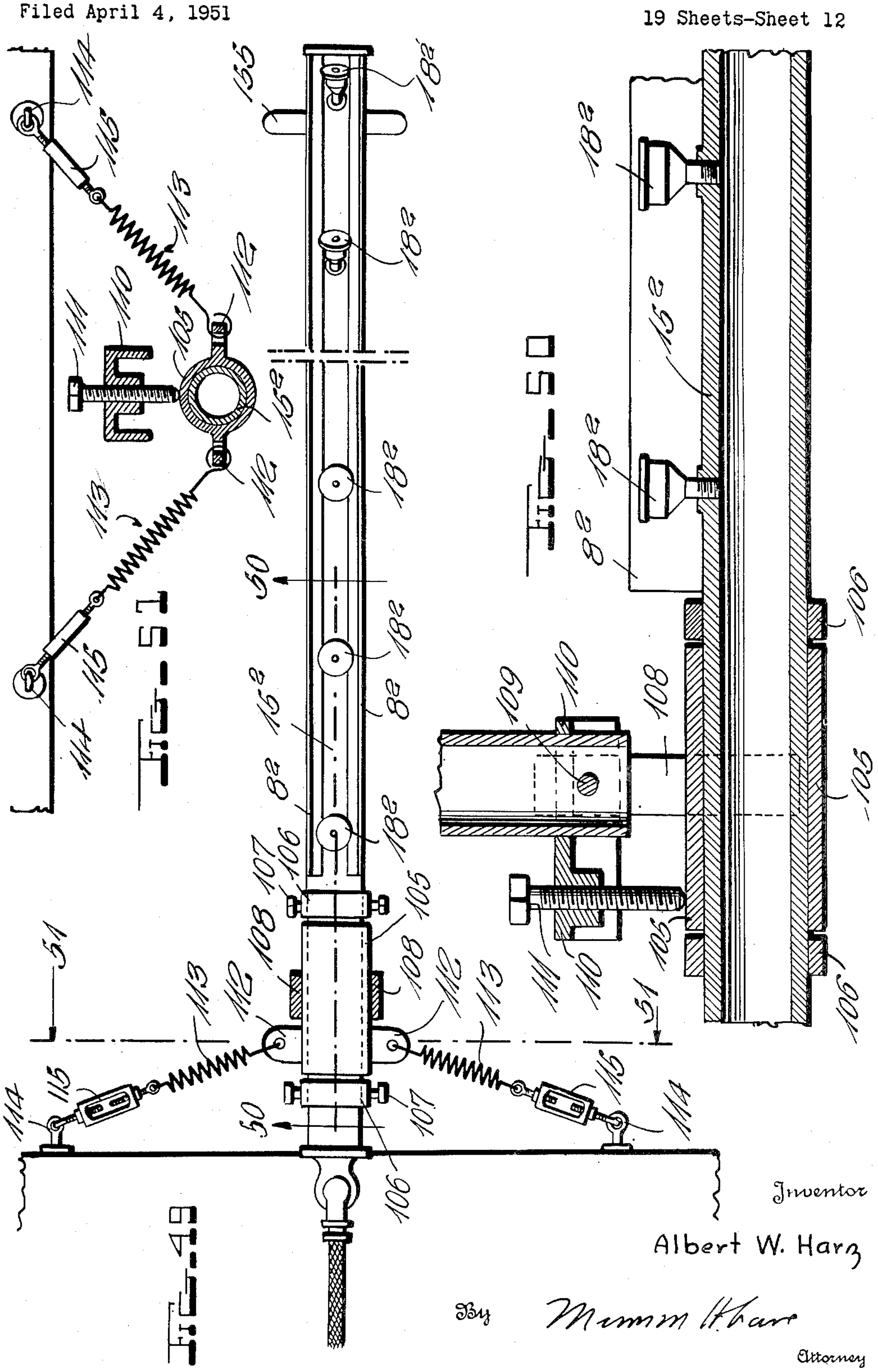
Figures 52, 53, 54:
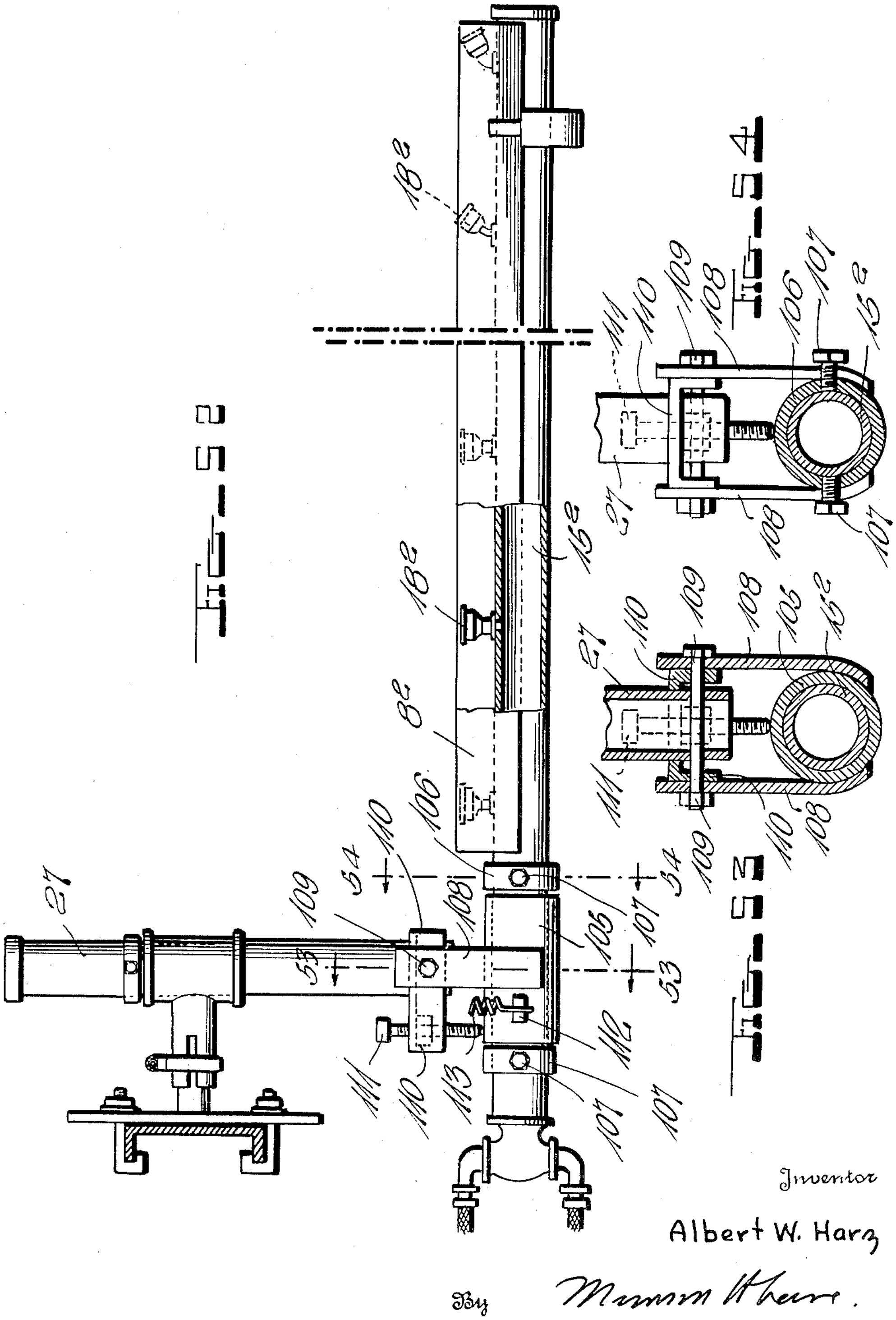
Figures 55, 59, 60:
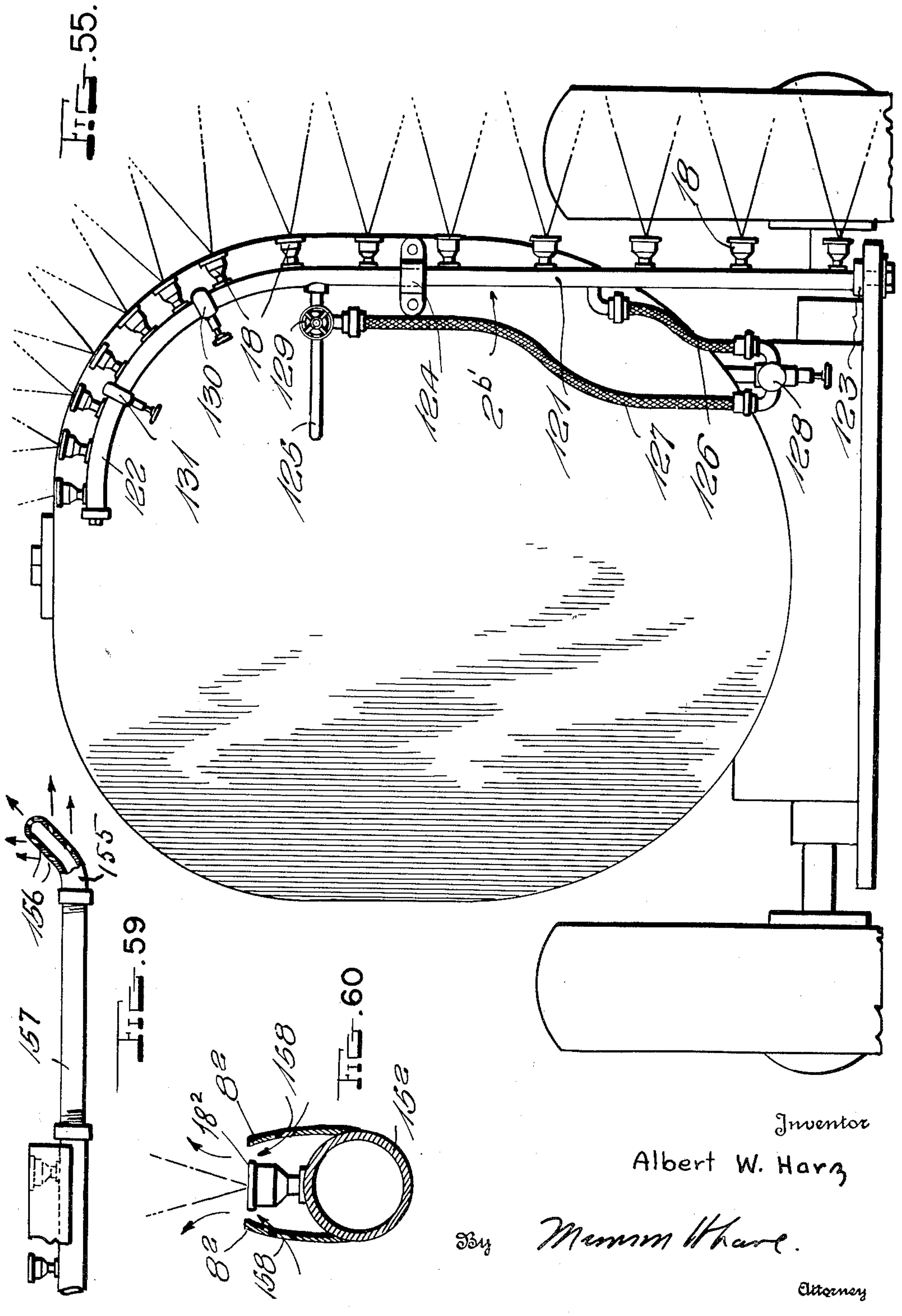
Figures 56, 57, 58:
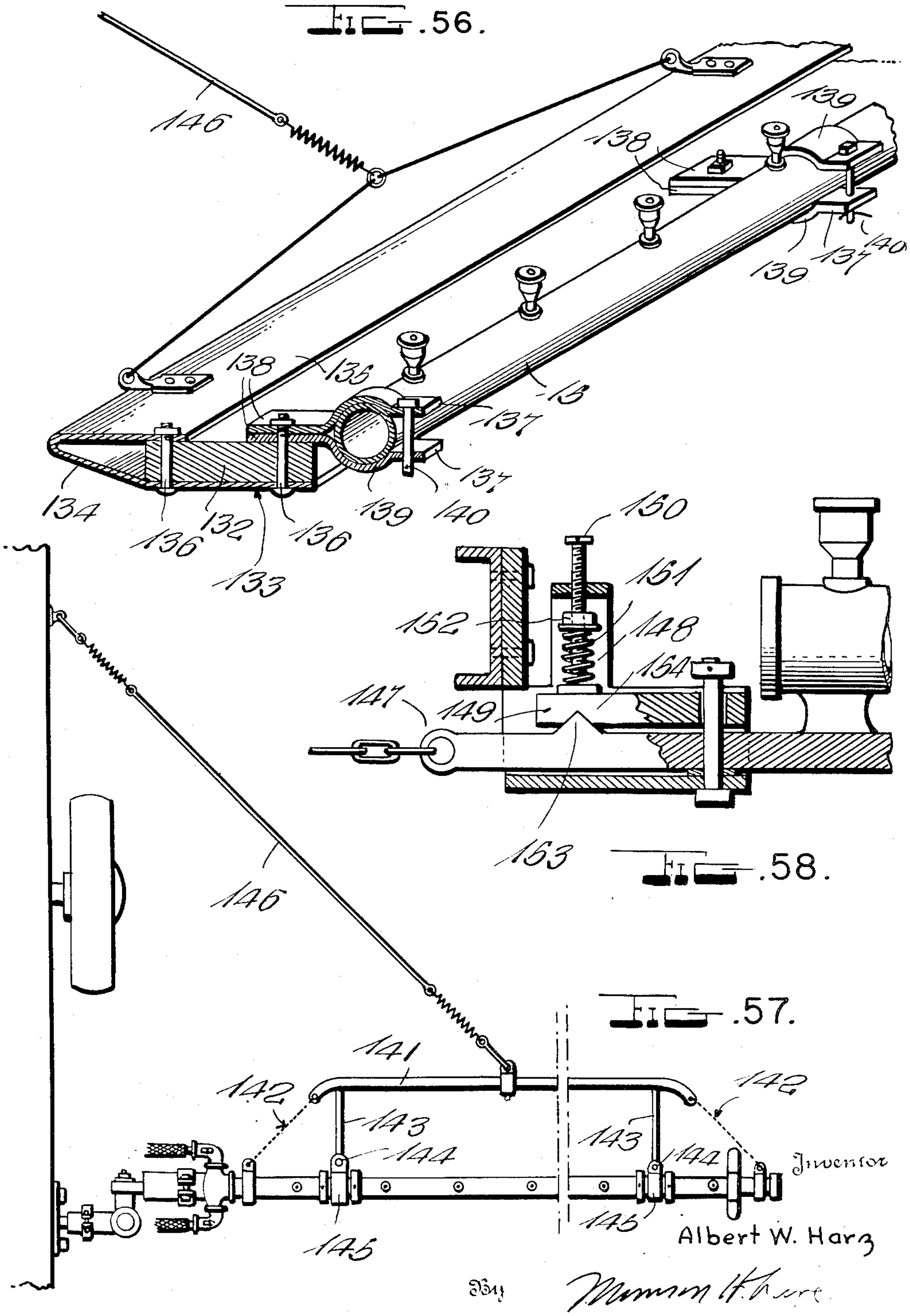
Figures 61, 62:
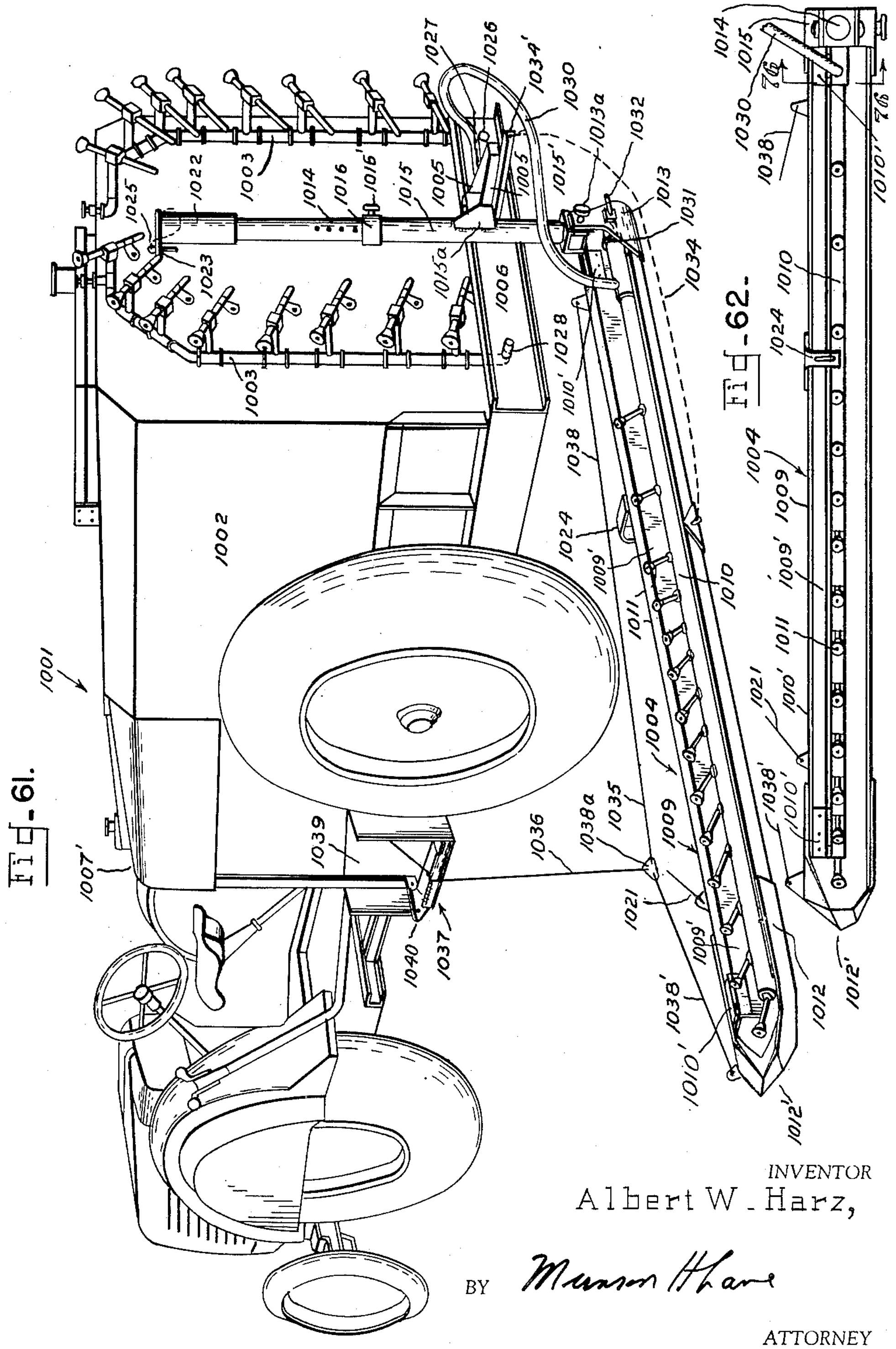
Figures 63, 64, 65:
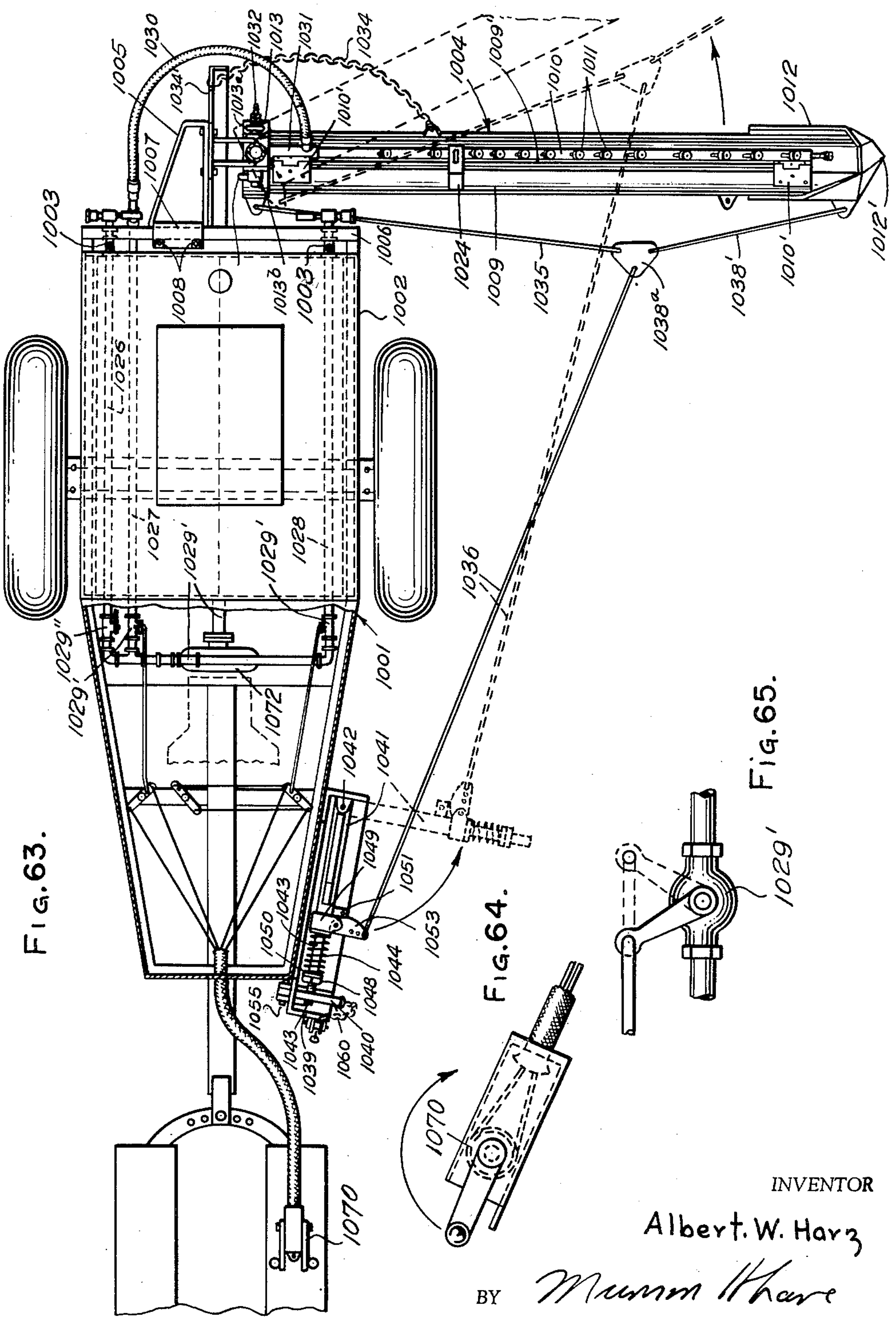
Figures 66, 67, 68, 69, 70:
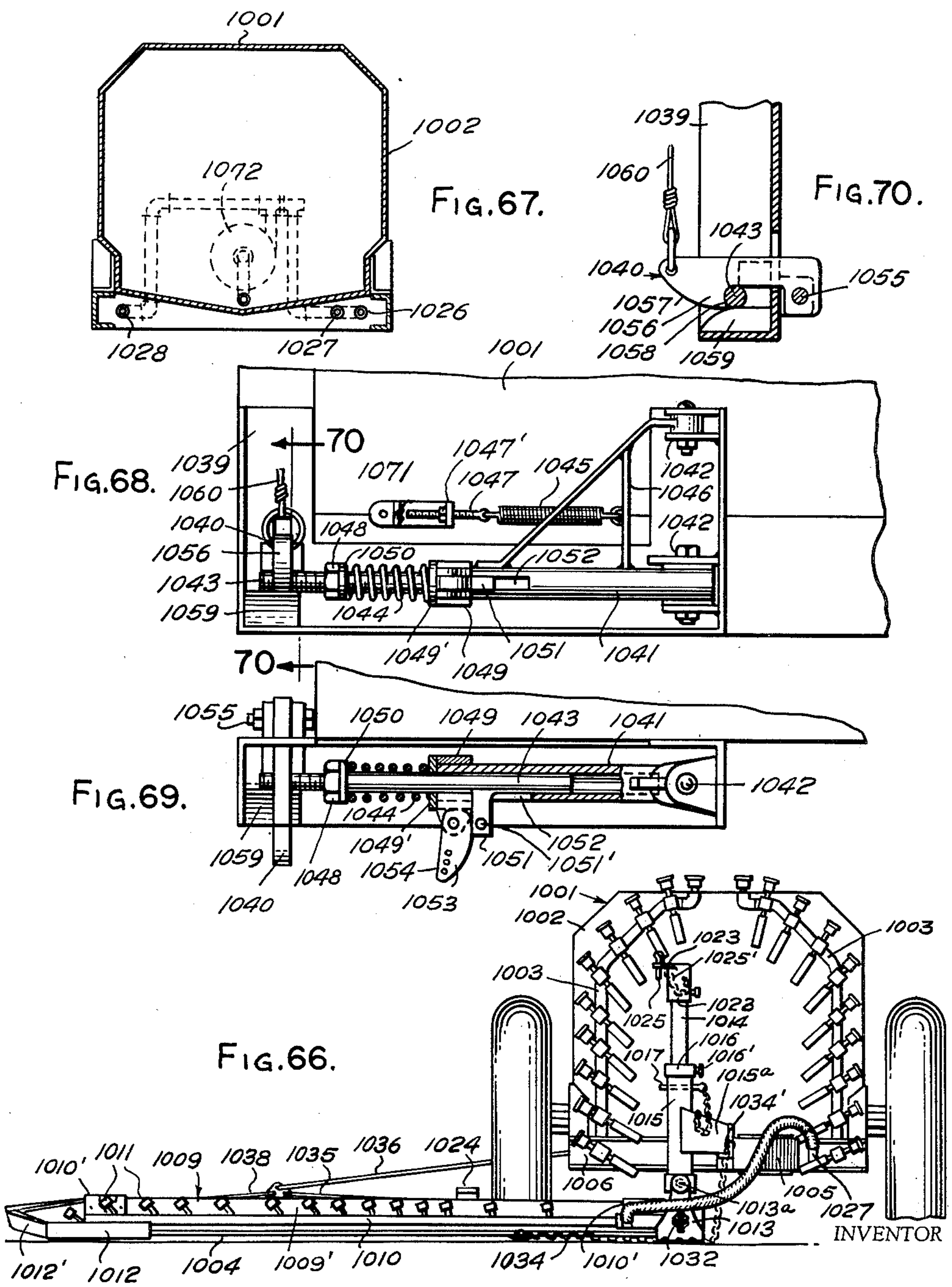
Figures 71, 73:
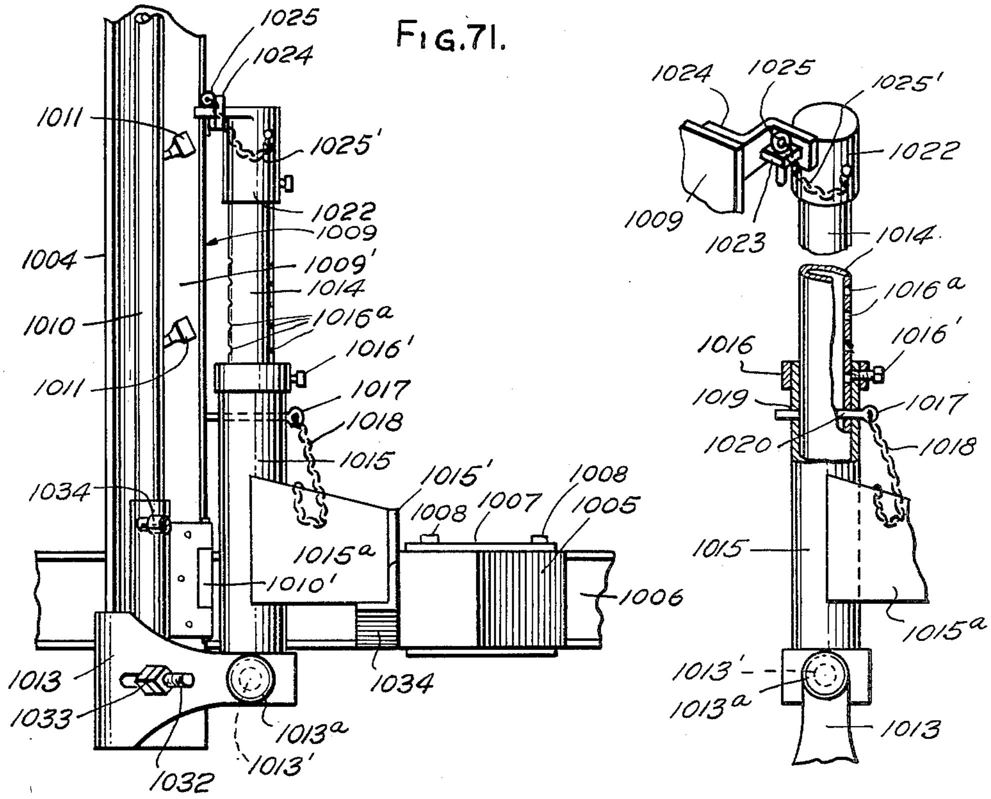
Figure 72:
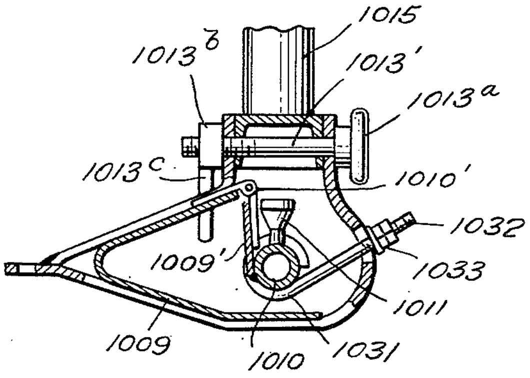

Figs. 33 and 34 are transverse sections on the lines 33—33 and 34—34 of Fig. 31;

Figs. 35 and 36 are views similar to Figs. 31 and 32, Fig. 35 being a section on the line 35—35 of Fig. 36, of a still further modified construction of spray boom;

Fig. 37 is a transverse section on the line 37—37 of Fig. 35;

Figs. 38 and 40 are fragmentary plan views of spray pipes, and Figs. 39 and 41 are cross-sections on the lines 39—39 and 40—40 thereof, showing the use of shields of different forms welded to the pipes;

Fig. 42 is a vertical longitudinal section on line 42—42 of Fig. 43 showing another modified construction of boom in which the spray pipe is provided with an auxiliary shield welded thereto;

Fig. 43 is a transverse section on the line 43—43 of Fig. 42 showing the spray pipe in normal vertical-spraying position;

Figs. 44 and 45 are views similar to Fig. 43 showing the spray pipe arranged to discharge forwardly and rearwardly;

Fig. 46 is a view similar to Fig. 43 showing a modification in the form of the auxiliary shield;

Fig. 47 is a fragmentary side elevation showing still another arrangement of means for staying the boom;

Figs. 48 and 48a are fragmentary plan views and Fig. 48b is a side elevation showing means for staying the boom;

Fig. 49 is a plan view of another modified form of spray boom and a portion of the carrier vehicle frame, showing a modified mode of mounting the boom and permitting it to yield when encountering an obstruction;

Fig. 50 is a view in vertical longitudinal section through the boom shown in Fig. 49, taken on line 50—50 of Fig. 49;

Fig. 51 is a vertical transverse section taken substantially on line 51—51 of Fig. 49;

Fig. 52 is a view in side elevation on an enlarged scale of the boom and its mounting means shown in Figs. 49, 50 and 51;

Figs. 53 and 54 are vertical transverse sections on the lines 53—53 and 54—54 of Fig. 52;

Fig. 55 is an end elevation showing another modified form of vertical boom;

Fig. 56 is a perspective view showing the use of a removable grass fender or guard;

Fig. 57 is a plan view showing the use of another form of grass fender or guard;

Fig. 58 is a view of a boom holding and releasing device or hitch which may be employed;

Fig. 59 is a view showing a boom construction having an end spray extension;

Fig. 60 is a cross-section through a boom of the type shown in Fig. 49 having guard means of a type to control the spread of the spray;

Fig. 61 is a perspective and partially diagrammatic view showing another modified and preferred form of spraying means, mounted on a carrier vehicle;

Fig. 62 is a top plan view of the horizontal spray boom shown in Fig. 61;

Fig. 63 is a plan view of the spraying rig shown in Fig. 61, including the carrier vehicle, portions of the vehicle being broken away;

Fig. 64 is a detail view in side elevation of a remote control for the spray fluid valves;

Fig. 65 is a detail view in side elevation of one of the spray fluid valves;

Fig. 66 is a rear view of the rig shown in Fig. 63;

Fig. 67 is a vertical section on line 67—67 of Fig. 63;

Fig. 68 is an enlarged detail view in side elevation of the safety stay for releasably holding the horizontal boom in working position;

Fig. 69 is a plan view of parts shown in Fig. 68, some parts being shown in section;

Fig. 70 is a detail sectional view on line 70—70 of Fig. 68;

Fig. 71 is a fragmentary rear elevation on an enlarged scale of parts of the carrier vehicle and of the under tree spray boom, the latter being shown raised and secured in its inoperative position;

Fig. 72 is a detail view of the upper end of the supporting post and a fragmentary portion of the horizontal boom, showing the fastening means for holding the boom in raised position; and Fig. 73 is a detail section on line 73—73 of Fig. 63 through the pivoted end of the horizontal boom, showing the stirrup and associated parts for supporting the boom and varying the working angle of the spray pipes.

Referring now more particularly to the drawings, and especially to the embodiment of the invention disclosed in Figs. 1 to 16, inclusive, 1 designates a suitable carrier vehicle adapted to be drawn or propelled in any suitable manner over the ground, and 2 designates my improved spray boom applied thereto. The vehicle 1 may be one supported on wheels or runners and capable of being steered or of being attached to another steerable vehicle which is drawn by one or more draft animals, or is motor propelled, and I do not limit myself in any of these particulars or to the use of any particular type of carrier vehicle. In the present instance I have shown a wheeled type of vehicle to which the boom 2 is applied, on which vehicle is mounted a tank 3 to contain the liquid or solution to be sprayed, which may be supplied to the boom under a desired high pressure. A suitable construction of pumping means (generally indicated at 3′) may be employed on the vehicle for this purpose and to force the liquid to the sprayer through a supply pipe 4 having arranged therein a suitable pressure gauge 5 and one or more controlling and cut-off valves 6. The delivery end of this pipe is preferably arranged at one end of the vehicle, and at this end of the vehicle is provided a railed platform 7 on which an operator may stand in a position to operate the valve or valves 6 and other controls to govern the supply of liquid to and the working operations of the spray boom. At this end of the vehicle may also be mounted all of the vehicle controls, which are not shown herein as they may be of any conventional type, thus allowing the vehicle to be driven and the boom to be operated by the driver of the vehicle, namely, a single operator standing on the platform.

The boom 2 comprises in its construction a longitudinally channeled guard or shield 8 made of some strong and durable sheet metal or other suitable material. This guard has a main horizontal base or shoe portion 9 terminating at its rear edge in an upstanding flange 10, an upwardly and forwardly inclined guide plate or fender portion 11 at the front of the shoe, an inwardly and rearwardly inclined nozzle guard plate or apron 12, and a curved or rounded nose portion 13 joining the forward edges of the plates 11 and 12. The shoe 9 forms a stable support to adapt the guard to run in contact with the ground, if desired, or in close proximity thereto, while the plate 11 serves as a guide runner to guide the guard over stones and other obstructions to adapt the guard to slide easily over the same without injury to the boom. The nozzle guard plate or apron 12, as shown, projects rearwardly over the plate 11 and the forward portion of the shoe 9 and terminates forwardly of the flange 10 and above the horizontal plane thereof and in vertical alinement with the vertical longitudinal center of the shoe 9. By this construction a longitudinal slot or opening 14 is provided at the upper rear portion of the guard for the mounting of the spray pipe and nozzle and to admit of their movements and the discharge of the spray in the manner hereinafter described. The plate 12 serves not only to protect the spray pipe and nozzles from injury by contact with tree limbs and other growing vegetation or obstructions, but also provides a lifting means to engage under the low lying limbs or branches of trees or plants as the boom travels forward, and to elevate such limbs or branches to cause them to pass over the slot 14 and within the spraying zone of the nozzles, so that the branches will be effectively sprayed and prevented from acting as obstructions to the travel of the boom.

Figures 11, 12, 13, 14, 15, 16:
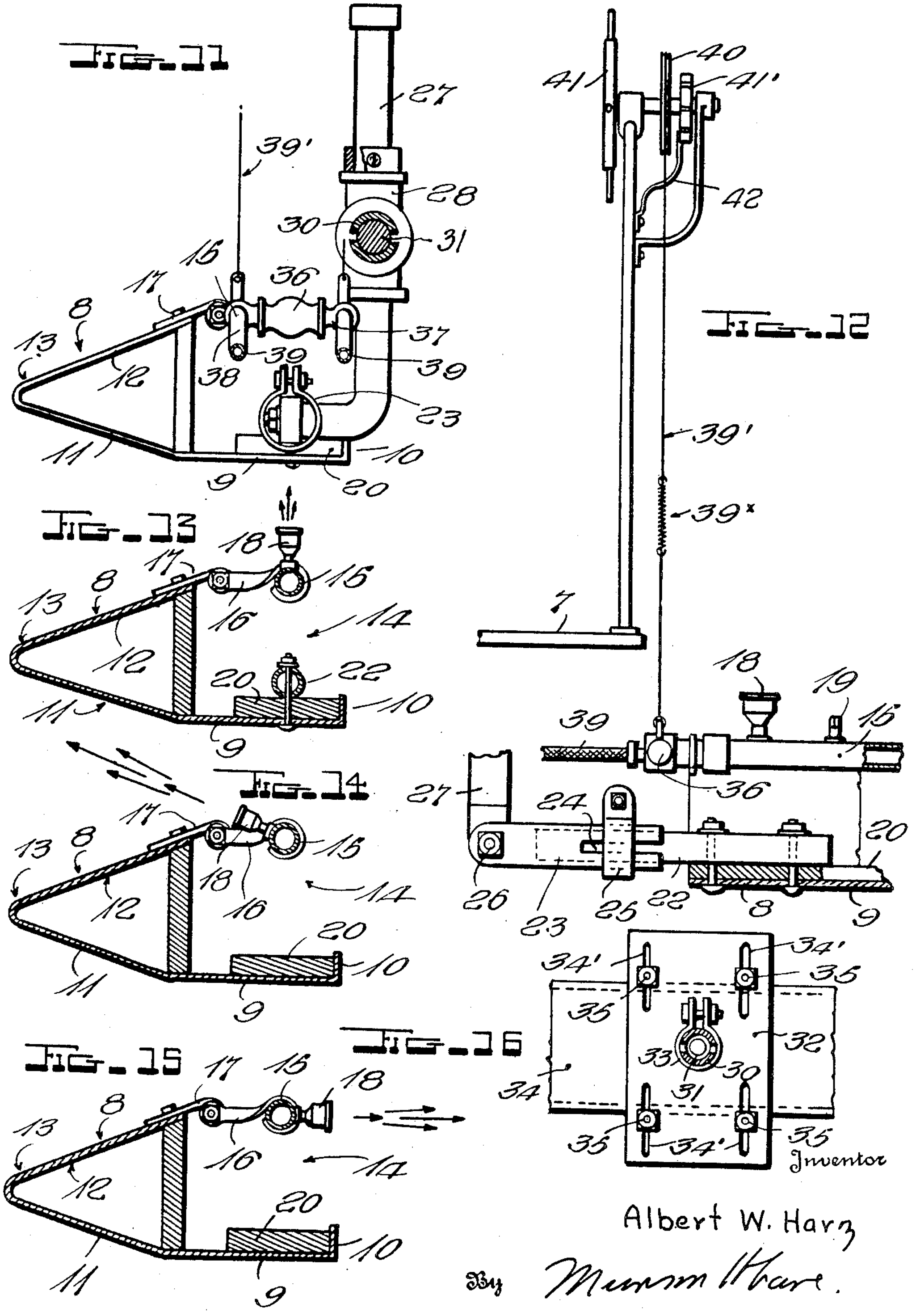
Fig. 11 is a detail section through the inner end of the boom looking toward the boom mounting and spray liquid supplying connections.
Fig. 12 is a front elevation, partly in vertical section, showing on an enlarged scale a portion of the boom and parts of its mounting and the boom oscillating means.
Figs. 13, 14 and 15 are transverse sections through the boom, illustrating different spraying positions of the spray pipe.
Fig. 16 is a view showing the boom supporting bracket plate and its mode of attachment to the carrier vehicle frame.

The spraying means is designed and adapted to be mounted in the guard or shield so that it may be manually or automatically adjusted or oscillated to discharge the spray through the slot vertically upward, or horizontally, or at an angle through an arc of approximately 180° between limits at the front and rear of the boom. As structurally embodied in the boom shown in Figs. 1 to 16, inclusive, the spraying means consists of a spray pipe or pipes 15 (one or more) extending longitudinally of the slot 14 adjacent to and just below the level of the inner edge of the apron 12 and carried by bearing links or brackets 16 secured to the upper rear edge 17 of the apron. Two or more parallel pipes may be used, which may be in the same horizontal plane or may be arranged in different planes, as desired. The pipe 15 is coextensive in length, or substantially so, with that of the guard 8, and is provided at desired intervals with discharge openings in which may be welded or otherwise secured the nipples of spray nozzles 18 of suitable type. These nozzles may be constructed to discharge the spray in concentrated, spread or whirling streams. The nozzles may be arranged at equal or unequal distances apart and in the same or different planes, and, if desired, the pipe may be provided with other openings normally closed by caps or plugs 19, on removal of which other nozzles may be applied, so that any desired number and spacing of nozzles may be employed. Where a plurality of pipes are used the nozzles may be disposed to discharge at different angles or to discharge overlapping sprays. The pipe 15 is fixed to swing with or is journaled to rotate in the links or brackets 16 so that it may be oscillated to dispose the nozzles in a forward position, to discharge the spray directly upward vertically, as shown in Fig. 13, or to dispose them in a rearward position to discharge the spray horizontally over the flange 10, as shown in Fig. 15, or to dispose them in any intermediate position, as shown, for example, in Fig. 14, to discharge the spray upwardly at different angles between the vertical and horizontal.

It will be observed that the nozzles 18 are arranged to swing clearly in the opening 14 below the level of the rear portion of the apron 12, and to be guarded thereby against injury by tree or plant limbs sliding over the guard. It will also be observed that the guard, constructed in the manner described, generally comprises a lower shoe portion to ride upon the ground, an upper shield or apron overhanging and protecting the sprayer, a spray discharge opening at the upper rear portion of the guard, and inclined portions forming a V-shaped nose closing the space between the shoe and apron at the front of the guard, said inclined portions having the guiding functions hereinbefore described.

Means are provided for mounting the boom in a novel manner on the frame of the carrier vehicle 1 and for supplying spray liquid to the spray pipe and oscillating said pipe, all of which I will now proceed to describe.

Figures 3, 4:
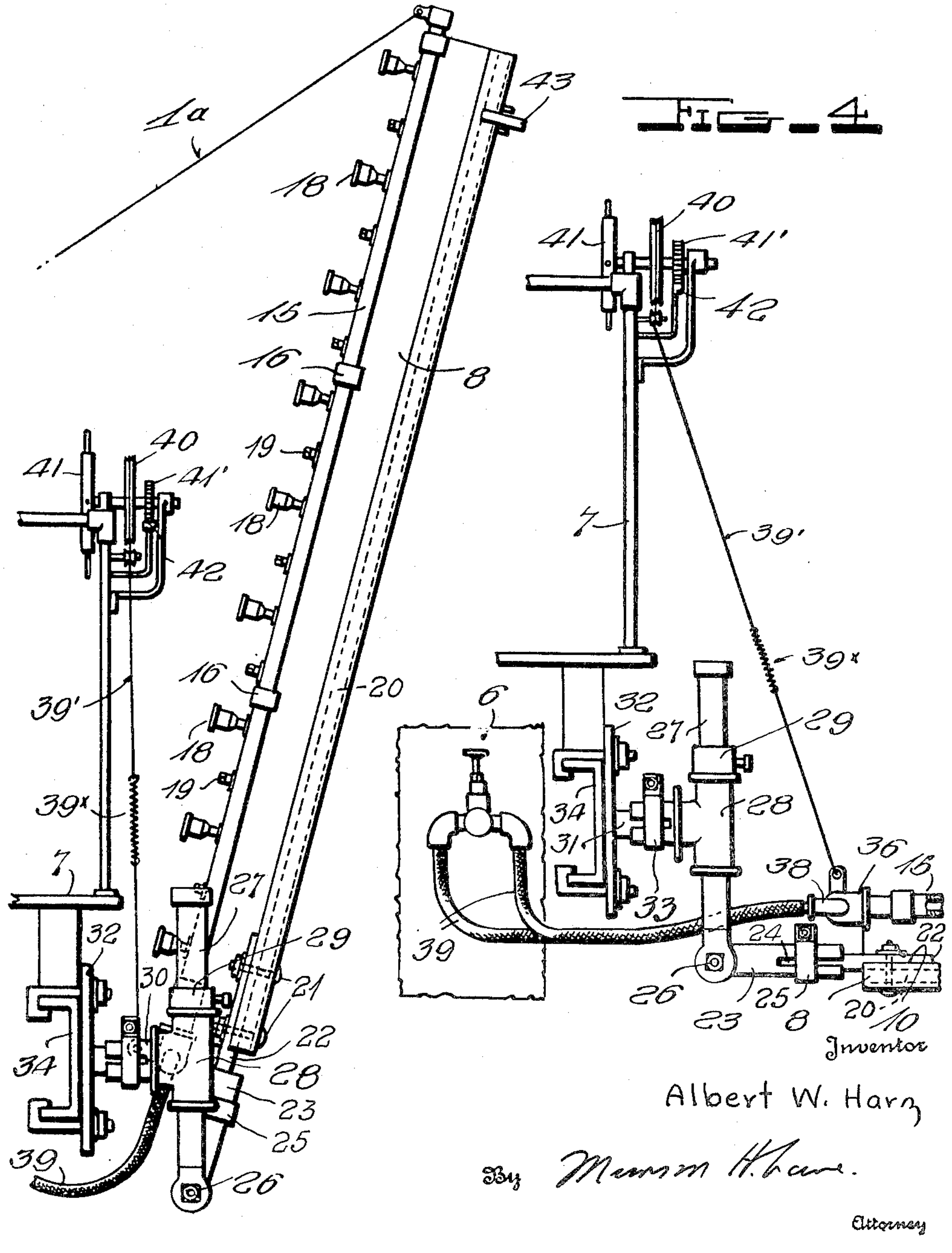
Fig. 3 is a sectional end elevation of parts disclosed in Figs. 1 and 2 on an enlarged scale, showing the horizontal boom raised to its non-working position.
Fig. 4 is a view similar to Fig. 3 of the horizontal boom (a portion of which is shown), and showing more particularly the boom mounting means and spray liquid supplying and controlling means.
Figure 5:
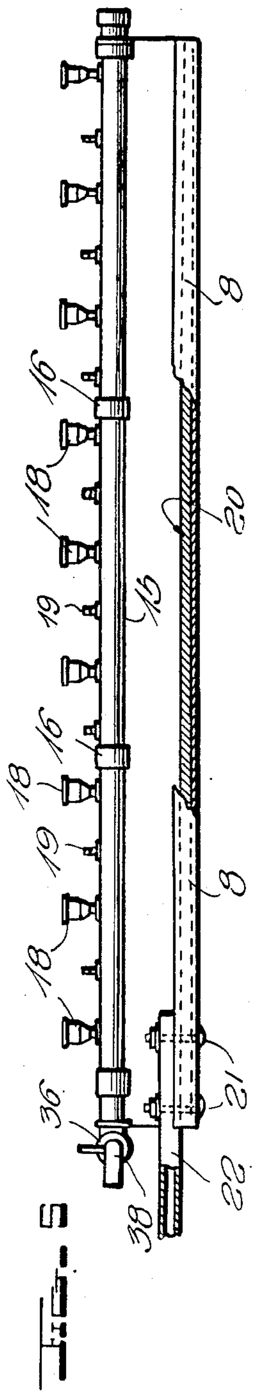
Fig. 5 is a rear elevation, partially in section of the horizontal boom of Figs. 1, 2 and 3, the supporting casters being omitted in this figure.
Figure 6:
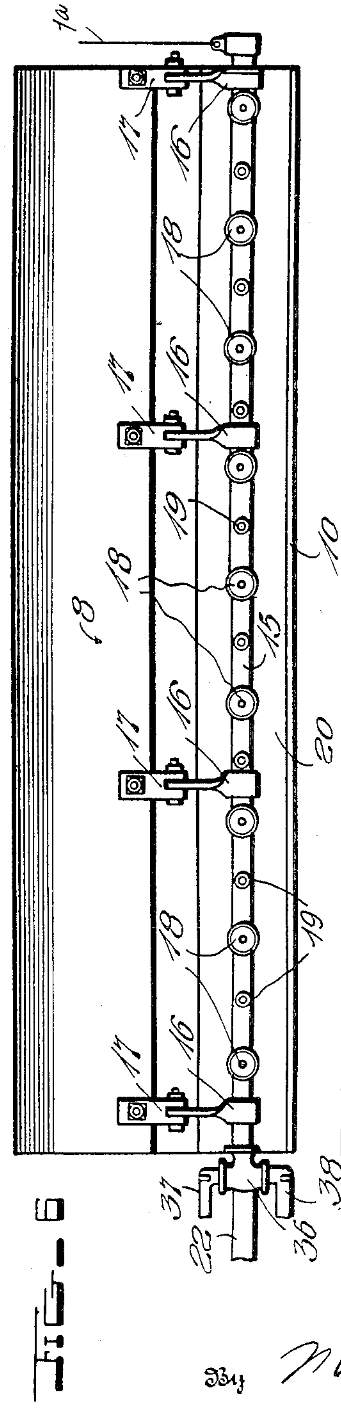
Fig. 6 is a top plan view of the same.
Figure 7:
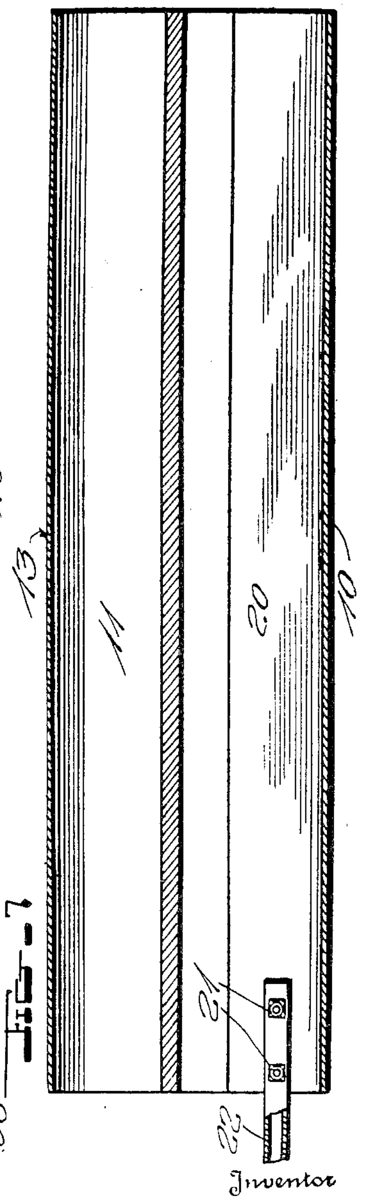
Fig. 7 is a vertical longitudinal section through the boom.
Figures 8, 9, 10:
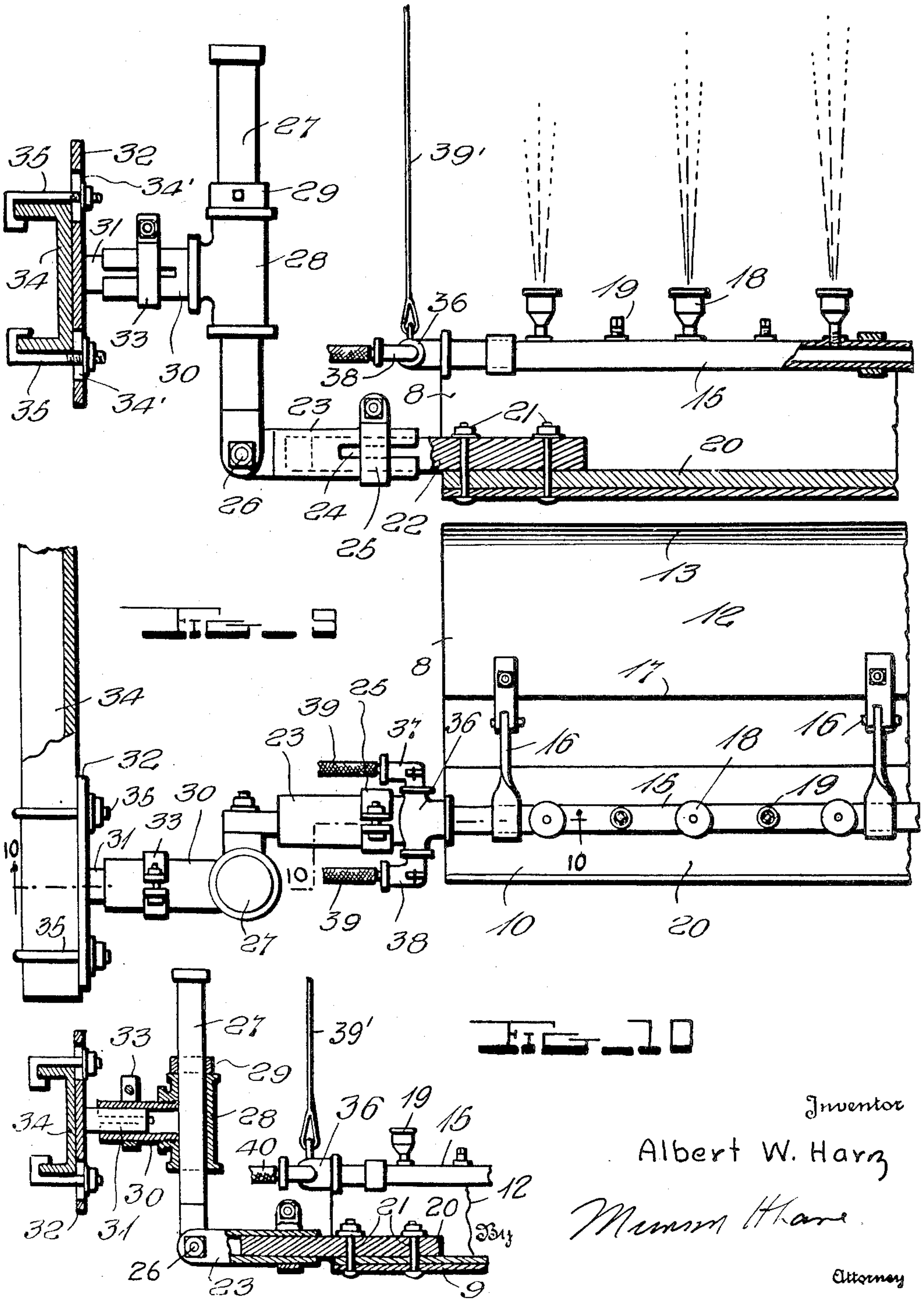
Fig. 8 is a vertical section through the inner end of the boom, showing in detail the mode of mounting the spray pipe in the shield and mode of mounting the shield on the frame of the carrier vehicle.
Fig. 9 is a top plan view of the parts shown in Fig. 8.
Fig. 10 is a view mainly in vertical section on line 10—10 of Fig. 9 through the mounting parts of the boom structure shown in Figs. 8 and 9.

Fixed to and extending along the upper surface of the shoe plate 9 is a reinforcing and supporting bar 20. One end of this bar terminates at or projects a distance beyond the inner end of the guard 8 and has fixed thereto, as by suitable fastening means 21, the outer end of a tube 22 which is telescopically received by a second tube 23, the outer end of the tube 23 being longitudinally split, as shown at 24, and adapted to be contracted about and clamped to the tube 22 by a clamping collar or sleeve 25. The opposite or inner end of the tube 23 is pivotally connected, as at 26, to the lower end of a post or standard 27 which is vertically adjustable and slidable in a split T-collar or bracket sleeve 28 and adapted to be limited in downward movement thereon by a stop collar 29. Fixed to the T-collar 28 is a split tube or pipe clamp 30 which telescopically receives a rod or tube 31 welded to a bracket plate 32, a clamping collar 33 being provided to detachably clamp the pipe clamp 30 to the tube 31, whereby the bracket sleeve or collar 28 is mounted on the bracket plate 32. The bracket plate 32 is arranged to bear upon one of the side frame beams 34 of the vehicle 1 and is provided with slots 34′ (Fig. 16) for the passage of clamp bolts 35 engaging the beam 34, whereby the bracket plate 32 is adjustably mounted on the beam and adapted to be fixed in adjusted position thereon. The boom is thus mounted at one end upon the frame of the vehicle 1 so that it may be disposed in a normal horizontal working position, as shown in full lines in Figs. 1 and 2, in which it extends laterally from the vehicle, and so that it may be swung upon the pivot 26 to an inoperative substantially vertical position, as shown in Fig. 3, to which it may be drawn and in which it may be held by any suitable means, allowing the apparatus as a whole to be transported, without interference from the boom, from place to place and to be stored when not in use within a minimum amount of space. It will be obvious from the foregoing that the adjustable connection between the bracket tubes 22, 23 adapts the boom to be adjusted as to length so as to extend a greater or less distance from the carrier vehicle, that the adjustable connection between the post 27 and bracket sleeve 28 adapts the boom to be adjusted vertically to suit varying levels of ground surface with relation to the vehicle frame, and that the adjustable connection between the bracket plate 32 and frame bar 34 allows a further vertical adjustment between the boom and vehicle frame to be made. Either of these vertical adjustments may be employed without the other, and both adjustments may be made if required and if found best for a working operation. A feature of the invention resides in the fact that as the post 27 fits somewhat loosely in the sleeve 28 the post is allowed to have vertical up and down play and is adapted to drop downward with the boom and permit the latter to drop from one ground level to a lower ground level or move from a low level to a higher level in the event of such a change of level occurring in the working travel of the apparatus over uneven ground. Also, the pivotal connection 26 adapts the boom to swing up or down to conform to slope variations or like irregularities of ground surfaces. All of these changes of position of the boom to accommodate itself to ground surface variations are automatic and obtained in a simple manner and without effort on the part of the operator. A rope or cable $1^a$, fastened at one end to the outer end of the boom, and adapted to be fastened at its opposite end to a part of the vehicle or to the frame of the platform 7 or any suitable position forward of the boom, may be provided and suitably arranged to stay the boom against rearward swing under drag resistance and/or to adapt the boom to be swung upward to non-working position, as shown in Fig. 3, and fastened in such position. The rope or cable $1^a$ may be suitably arranged to act as a stay to prevent rearward swinging of the boom under drag resistance or when encountering an obstruction over which it cannot readily pass. When so used and arranged its end fastened to the frame may be released by the operator when the boom strikes an obstruction liable to damage it, as will be more fully described hereinafter. When employed as a stay the cable will, in practice, be preferably so arranged that it will not interfere with the passage of the boom under trees having low-lying branches. The stay construction shown in Figs 25 to 28 is, however, preferred, as hereinafter described. Furthermore, by loosening the clamp 25 the tube 22 may be rotated with relation to the tube 23, and then fixed thereto by tightening the clamp 25, so that the boom may be tilted about a horizontal axis to adapt it to travel in a tilted position, i. e., with its guard nose disposed at a greater than normal angle to the ground surfaces.

The means for supplying the spray liquid or solution to the pipe 15 and oscillating the latter may be of any suitable construction, but as shown in the present instance comprises a T-coupler head 36 provided at the inner end of the pipe and having elbow arms 37 and 38 adapted for connection with feed pipes 39, 39, which are preferably flexible hose pipes, leading from the supply pipe 4, from which the supply of liquid to the spray pipe may be controlled by operation of the control valve or valves 6. These flexible pipes permit the spray pipe to be freely oscillated in its bearing brackets, and the arms 37 and 38 are adapted to serve as crank arms through which oscillating motion may be transmitted to the pipe. Any suitable means, manually or automatically operable, may be provided for the purpose of transmitting such motion to the pipe, and the same or coacting means may be used to lock the pipe in any of its spraying positions. As at present embodied (Figs. 3, 4 and 12) cables or sprocket chains 39′ are connected to the arms and pass over a pulley or sprocket wheel 40 mounted on the platform 7 and associated with a hand wheel 41 or its equivalent whereby, by turning the hand wheel in one direction from a normal position and back again, motion may be transmitted to oscillate the spray pipe to direct the discharging spray through an arc for an efficient spray spreading action. The cables or chains 39′ may be provided with tension springs $39^x$ to keep the tension of each cable or chain automatically adjusted at all positions, and the hand wheel 41 or its shaft may be provided with a toothed or recessed locking wheel or disk 41′ and a pawl or locking dog 42 of suitable type may be provided to engage the same whereby the spray pipe may be locked in a plurality of positions, to spray vertically, horizontally or at an intermediate angle. These operating and controlling parts are arranged in a position to be conveniently manipulated by an operator standing on the platform, who may direct the spray in a manner to secure the best spraying actions as conditions may require in the travel of the boom.

It will thus be understood that in the operation of the apparatus, and in its course of travel through an orchard, field or cultivated plot, the boom will be caused to move at a low level along the surface of the ground so as to pass beneath the limbs or branches of the trees or plants, and in such course of travel the sprayer may be operated to project the spray upward vertically, or horizontally, or at an angle to the horizontal at will and as required to more thoroughly spray the trees or plants than is possible with sprayers discharging vertically or horizontally at a high level. As it travels the boom will also lift all low lying branches or limbs so that these will be sprayed, with the result that low level branches or limbs will be completely sprayed without employing drenching actions involving the use of an undue amount and waste of the solution. It will, of course, be understood that the operator may control the action of the sprayer to cause it to project the spray continuously or for any period of time in any of the directions mentioned or may cause the sprayer to oscillate back and forth continuously to discharge the spray through an arc. As stated, the sprayer may be manually oscillated by the means shown or it may be oscillated automatically by suitable means, under control of the operator, and driven by the propelling or pumping mechanism, or running gear of the machine, or an eccentric drive mechanism including a driver running in contact with the ground. If desired, the boom may be equipped with one or more caster or other wheels 43 or other means to adapt it to travel easily over the surface of the ground. It will be understood that the use of the end caster wheels 43 is optional and that these wheels may be dispensed with if desired, and even where used such caster wheels or rollers do not interfere with the ground engaging function of the shoe 9 and the inclined plate 11, which inclined plate in any event serves as guide runner to guide the boom over stones and other obstructions without injury to the spray pipe. Moreover, in case of uneven ground portions of both the horizontal shoe 9 and of the inclined guard or fender 11 may come in contact with the ground even though an end roller 43 be employed to facilitate movement of the boom over smooth or level ground. In addition to the fact that the guard apron serves as a lifter of low lying branches or limbs of trees and other plants, it is to be noted that this apron serves also to deflect and prevent fruit, leaves, twigs, stones and other materials or debris from gaining access to and clogging the nozzles. It acts to push down the growing vegetation of a cover crop so that the sprayer may pass over the vegetation without injury thereto, allowing the vegetation to return to normal position after the sprayer has passed.

While I have shown and described the use of a spray pipe carrying fixed nozzles and which is mounted to swing and/or to rotate for an oscillating action of the character set forth, I desire it to be understood that in practice I may use a stationary spray pipe and mount the nozzles to oscillate, and both of these modes of mounting are to be understood as falling within the spirit and scope of my invention. Also, if desired, and as hereinafter described, the guard or shield may oscillate with the spray pipe and nozzles.

Figures 17, 18, 19, 20, 21:
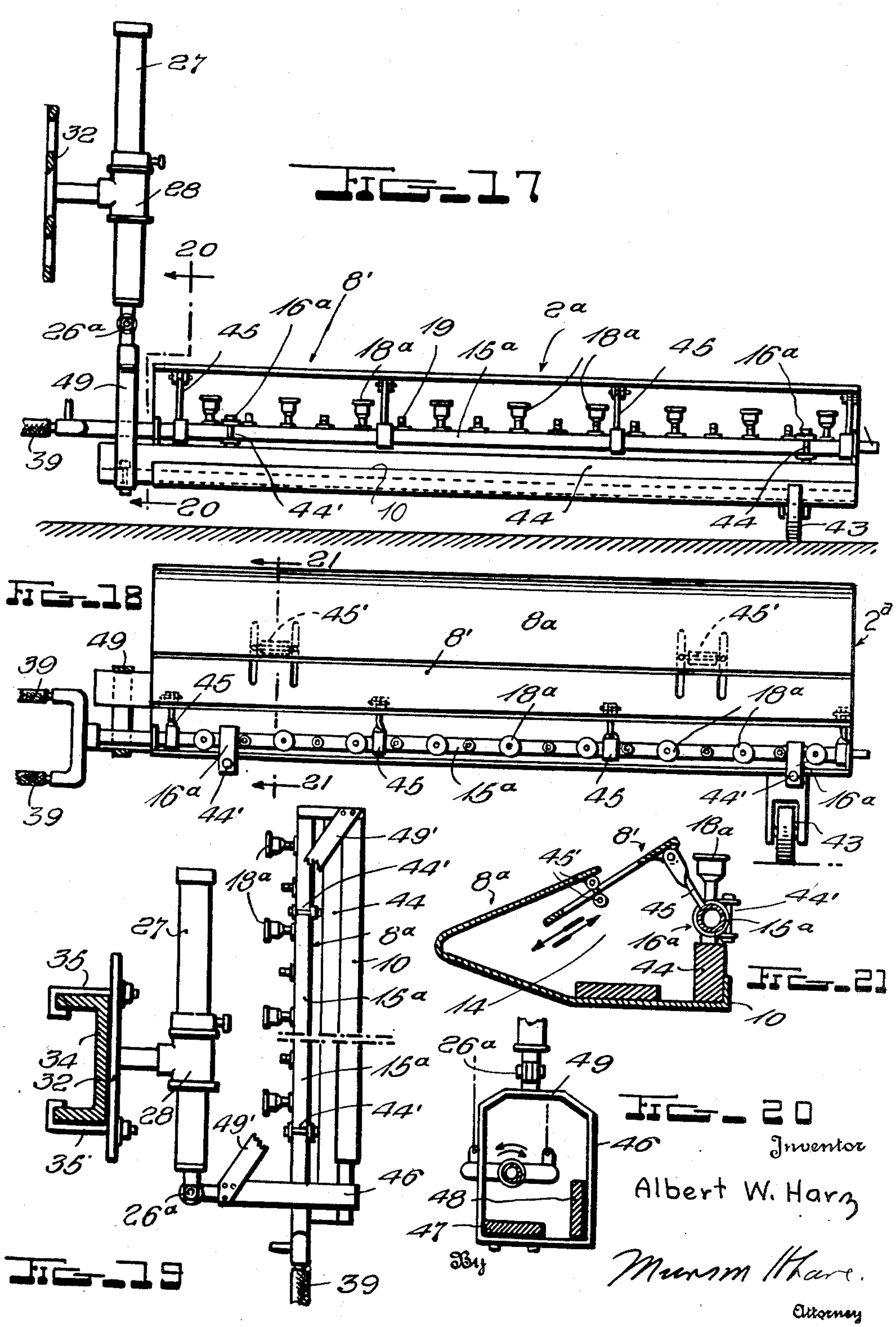
Fig. 17 is a vertical longitudinal section, showing a modified construction of boom and slightly modified construction of means for mounting the same.
Fig. 18 is a sectional plan view thereof.
Fig. 19 is a view showing the form of boom illustrated in Figs. 17 and 18 swung up to non-working position.
Fig. 20 is a section on the line 20—20 of Fig. 17.
Fig. 21 is a vertical transverse section taken, for example, on the line 21—21 of Fig. 18.

In Figs. 17 to 21, inclusive, I have shown a modified form of boom 2$^a$ in which the spray pipe 15$^a$ carrying the nozzles 18$^a$ is mounted to turn in U-shaped bearing brackets 16$^a$ fixed to a reinforcing and supporting bar 44 arranged in proximity to the flange 10 of the shield 8$^a$, the open side of each bracket being closed by a removable pin 44′ adapting the pipe to be readily mounted for use and removed for cleaning, repairs or other purposes. To the pipe are fixed crank arms 45 which are pivotally connected to the outer or rear edge of an auxiliary shield plate or apron 8′ mounted to slide on antifriction bearing rollers 45′ beneath the shield apron 12 and across the opening or slot 14 between the spray pipe and rear edge of the apron 12. This construction allows the apron 12 to be shortened and the opening widened to give the spray nozzles a longer range or arc of oscillating movement, as the auxiliary apron slides back and forth to cover the forward part of the opening and to constantly protect the nozzles in any of their working positions. This type of apparatus is very efficient for use in spraying citrus fruit trees, and may employ nozzles especially adapted for this purpose. In this form of the invention also there is a modification in the means for connecting the boom shield with the post wherein an inverted bail-shaped hanger member 46 (Fig. 20) is fixed at the lower ends of its arms to bars 47 and 48 fixed to the shield and is pivoted at its bend or return portion 49 to the lower end of the post 27, as at 26$^a$. This construction reduces the number of mounting parts and allows a boom of comparatively light weight to be made, and it also adapts the boom to be swung up to a vertical position parallel with the adjacent side of the vehicle carrier frame, as shown in Fig. 19. A brace 49′ may be provided to form a stay connection between the bail 46 and the boom shield or frame.

I may employ in conjunction with the horizontally operating boom 2 or 2$^a$, above described, a vertically arranged boom 2$^b$ (Figs. 1 and 21–24 inclusive) suitably mounted upon the adjacent side of the vehicle and including a shield 8$^b$ and a spray pipe 15$^b$ provided with nozzles 18$^b$ and having hose connections 39$^b$ with the liquid containing tank, the arms 37$^b$ and 38$^b$ of the inlet coupler 36$^b$ of which pipe may be connected by cables or sprocket chains 39″ or the like having tensioning springs 39$^x$ therein and passing over a pulley or sprocket wheel 40$^b$ mounted on the platform 7 and associated with a hand wheel 41$^b$ whereby motion may be transmitted to the spray pipe to turn it to different working positions or to oscillate it in an arc whose center is vertical or perpendicular to the ground surface. The hand wheel or its shaft may be provided with a toothed or recessed locking wheel or disk 41$^{b1}$ and a pawl or locking dog 42$^b$ of suitable type may be provided to engage the same whereby the spray pipe may be locked in any one of a plurality of positions to spray laterally or at right angles to the vehicle or outwardly and forwardly or outwardly and rearwardly, as will be readily understood. The spray pipe operating connections above described may be the same as those shown and described in connection with boom 2, and it will be understood that the locking wheel and dog may be replaced by a friction clutch to hold the spray pipe or pipes in any desired position. Also, if desired, the operating connections between a horizontal boom and a vertical boom in use may be coupled by continuing the control cables around the control cranks of both booms, or intergearing the booms or their connections so that the pipes of both booms may be adjusted or oscillated in unison. Furthermore, suitable means, such as a clutch, may be used to throw the gearing in or out, so that the pipes may be turned in unison or the pipes independently turned. The use of the vertical boom, which may be of any length or height desired, allows spray to be discharged to reach portions of trees at high levels which cannot be reached effectively by spray from the horizontal boom. When a horizontal boom and a vertical boom are in simultaneous operation, all portions of trees may be fully sprayed from one side in a single operation, but it will, of course, be understood that in practice such booms may be operated separately and alternately at different times or conjointly, according to the character and density of the spray to be projected to meet various service conditions. In practice the shield 8$^b$ serves to protect the vertical spray pipe and its nozzles from injury by contact with tree branches and the like. It is generally similar in construction to the shield 8, but may vary somewhat in form and construction therefrom and may be made of lighter material, inasmuch as it does not travel in contact with the ground.

By the use of the horizontal boom the greater part of the outside as well as the inside of a tree may be sprayed. The use of the vertical boom provides for the thorough spraying of any outside parts of tall trees not sprayed to an extent desired by the use of the horizontal boom alone.

From the foregoing description, taken in connection with the drawings, the construction, mode of operation and advantages of my invention as thus far described will be readily understood by those versed in the art without a further extended description, and it will be seen that the invention provides a spray boom apparatus of the underslung type which is designed and adapted for spraying all kinds of vegetation, but particularly for efficiently spraying trees and plants which cannot be sprayed to the best advantage by sprayers of the overhead or high level type. While the invention is especially directed to an underslung horizontal sprayer, it is apparent that features of the invention are capable of application to advantageous use in sprayers of vertical, horizontal-high-level and other types. In practice the spray booms of this invention may be used singly or in pairs (one following the other) on either side or on opposite sides of a carrier vehicle so that trees or plants of two adjoining rows may be simultaneously sprayed. Also, in practice one or more booms may be mounted on carrier vehicles towed from a tractor by means of a tow rope, cable, chain or like draft appliance. This towing means may be so mounted and used in conjunction with controlling means that the operator may release the boom for movement to a safe position when it strikes or is about to strike an obstruction over which it cannot ride, so as to prevent damage to the boom. Similar means may be employed to stay a boom mounted on a carrier vehicle which may be released by the operator to free the boom and allow it to swing to a safe position when about to strike an obstruction over which it cannot ride without possibility of injury.

Staying means adapted for either of these purposes, and which is applied for use in connection with a boom mounted on a carrier vehicle, is particularly shown in detail in Figs. 25 to 28, inclusive, in order to avoid confusion in the showing of the general structure in the other figures of the drawings. As embodied therein, such staying means comprises a cable or rope 50 having at one end a loop or eye 50′ engaging the hooked end 51 of a holding dog 52 pivotally mounted, as shown at 53, upon the outer end of the frame or shield of the boom 2$^c$. A tension spring 54 is fastened at one end to the dog between its hooked and pivoted ends, and the other end of this spring is coupled to an adjusting bolt 55 passing through an opening in a bracket 56 mounted on the boom shield or frame and fitted with a holding and adjusting nut 57 whereby the tension of the spring may be varied. From the dog 52 the cable passes horizontally inwardly and forwardly over a guide pulley 58 mounted at a more or less advanced point on the carrier vehicle frame, and thence backwardly and upwardly over a pulley 59 to a winding drum or winch 60, to which its end opposite that first named is fastened. The shaft 60′ of this drum is provided with an operating handle 61 whereby the drum may be rotated to let out or take up the cable, and on said shaft is also mounted a brake head 62 engaged by a split friction brake band 63. The band has a suitable anchor connection, as at 64, with a fixed part of the vehicle or operator's platform on which the winch is mounted and has its ends provided with flanges 65 and 66. These flanges are apertured for passage of a bolt 67 carrying at one end an adjusting nut 68 bearing on the flange 66 and formed at its opposite end with a bifurcated head 69 bearing on the flange 65. A coiled spring 70 encircles the bolt between the flanges and normally acts thereon to expand and move the band to release-position. Pivoted to and movable in the bifurcated head 69 is a band operating eccentric 71 whose acting end is arranged to engage the flange 65 and which is pivoted at its opposite end to one end of an operating rod or link 72 which is pivoted at its opposite end, as shown at 73, to one end of an emergency release lever 74. This end of the lever 74 is pivoted, as at 75, to the fixed part of the vehicle or operator's platform on which the winch is mounted, and the opposite end of the lever is formed or provided with a suitable handle 76. The pivot 75, as shown, is arranged outwardly beyond and out of alinement with the pivot 73, so that when the lever is swung to the full line position shown in Figs. 25 and 26 the lever will be moved to a past center position and will be locked in such position, while a reverse movement of the lever will bring it to the release position shown in Fig. 27. When the lever is in locking position the rod or link 72 is drawn upon to swing the eccentric 71 to a position in which it presses downward on the flange 65 and draws on the bolt 67 to contract the band about the brake head 62 to hold the drum 60 against rotation. When the lever is swung to the release position, however, the eccentric is retracted, allowing spring 70 to spread and release the band so as to permit the drum to rotate and the cable to unwind therefrom. Normally, in setting the parts of the stay device in position for a staying action, the cable is wound on the drum until it is taut and until the dog 52 is tilted to stress the spring 54 to hold the cable 50 under a desired tension and to keep the loop 50' engaged with the hooked end of the dog, the parts being held in such positions by swinging the lever 74 to its full line holding position in which it holds the brake band engaged with the drum. The boom in its travel will thus be sustained by the cable against recession from its working position against drag resistance of vegetation or other ordinary obstructions over which it may freely pass. If, however, an obstruction should appear in the path of the boom over which it cannot pass without liability of injury, the operator, by a single movement, may swing the lever 74 to release-position, thereby instantly releasing the brake and allowing the cable to pay out to relatively stop the travel of the boom and allow it to recede without injury if it strikes the obstruction. If, at the end of the unwinding movement of the cable the strain on the cable should continue, then the pull of the cable will swing the dog 52 to release-position, thus pulling the cable from the boom and allowing the boom to swing rearwardly if the forward motion of the carrier vehicle has not been stopped. It will thus be seen that in an emergency the operator, by simply swinging lever 74 over to release-position, may instantly release the boom to prevent it from being injured by an obstruction over which is cannot freely pass.

Figures 25, 26, 27, 28, 29:
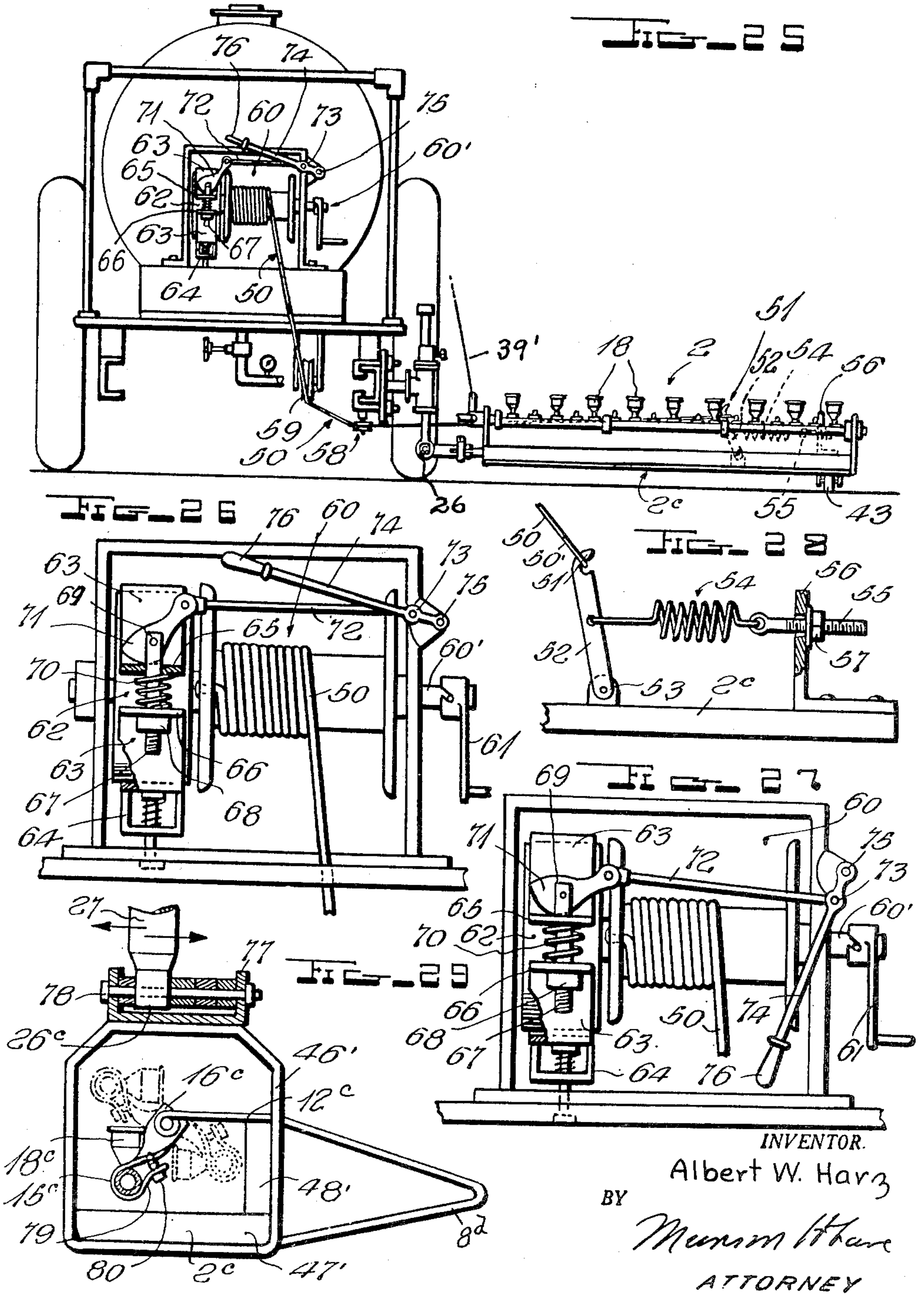
Fig. 25 is a view similar to Fig. 1, showing a further modified construction of boom and spray pipe mounting means and the use of a preferred type of boom staying and safety releasing means.
Fig. 26 is a view in elevation, partly in section, showing on an enlarged scale the winch and locking and releasing mechanism of the staying means disclosed in Fig. 25.
Fig. 27 is a view similar to Fig. 26 showing the locking and releasing means in stay cable releasing position.
Fig. 28 is a detail view of the coupling means for connecting the stay cable to the outer end of the boom.
Fig. 29 is a transverse sectional view through the inner end of the boom showing another modified mode of mounting the boom.

Fig. 29 shows another modification in the spray boom construction and in the means for connecting the boom shield with the boom supporting part. As embodied, the boom 2$^c$ comprises a shield 8$^c$ generally similar in construction to the shield 8$^a$ and having the wooden reinforcing or frame members 47', 48' and provided at its inner end with a bail-shaped hanger 46', to the top of which is welded a U-shaped bracket 77. Extending between the arms of this bracket and projecting therethrough is a bolt 78 pivotally engaging the eye 26$^c$ at the lower end of the post 27. On the bolt are mounted spacing washers 52 between any two of which the eye 26$^c$ may be disposed to properly center the eye for balancing the boom transversely or setting it to lie horizontally or at a desired angle to the horizontal. Pivoted to and beneath the upper edge of the apron portion 12$^c$ of the shield are hanger brackets or links 16$^c$ having at their opposite ends U-shaped clasp portions 79 which embrace and hold the spray pipe 15$^c$ clamped to the links, and which are adapted to be held in closed or clasping position by bolts 80. Nozzles 18$^c$ are mounted on the pipe as in the constructions previously described. In place of being so mounted the pipe may be brazed, welded or otherwise fixed to the links, but the construction shown and above described is preferable under some circumstances as it allows relative adjustment of the pipe and links to dispose the nozzles for working actions at any working angles desired. In the arrangement shown the parts are so disposed that when the pipe is in its normal position it will be located below and in rear of the plane of the rear edge of the apron 12$^c$ and the nozzles will be arranged in a vertical position to discharge in a straight line upwardly. From this position the pipe may be swung with the links upwardly and forwardly to bring the nozzles to a horizontal position and to discharge forwardly over the apron, or the pipe may be swung with the links downwardly and rearwardly to bring the nozzles to a rearwardly facing position beneath the upper rear portion of the apron for discharge outwardly over the rear flange 10 of the guard or shield.

Figures 1, 2:
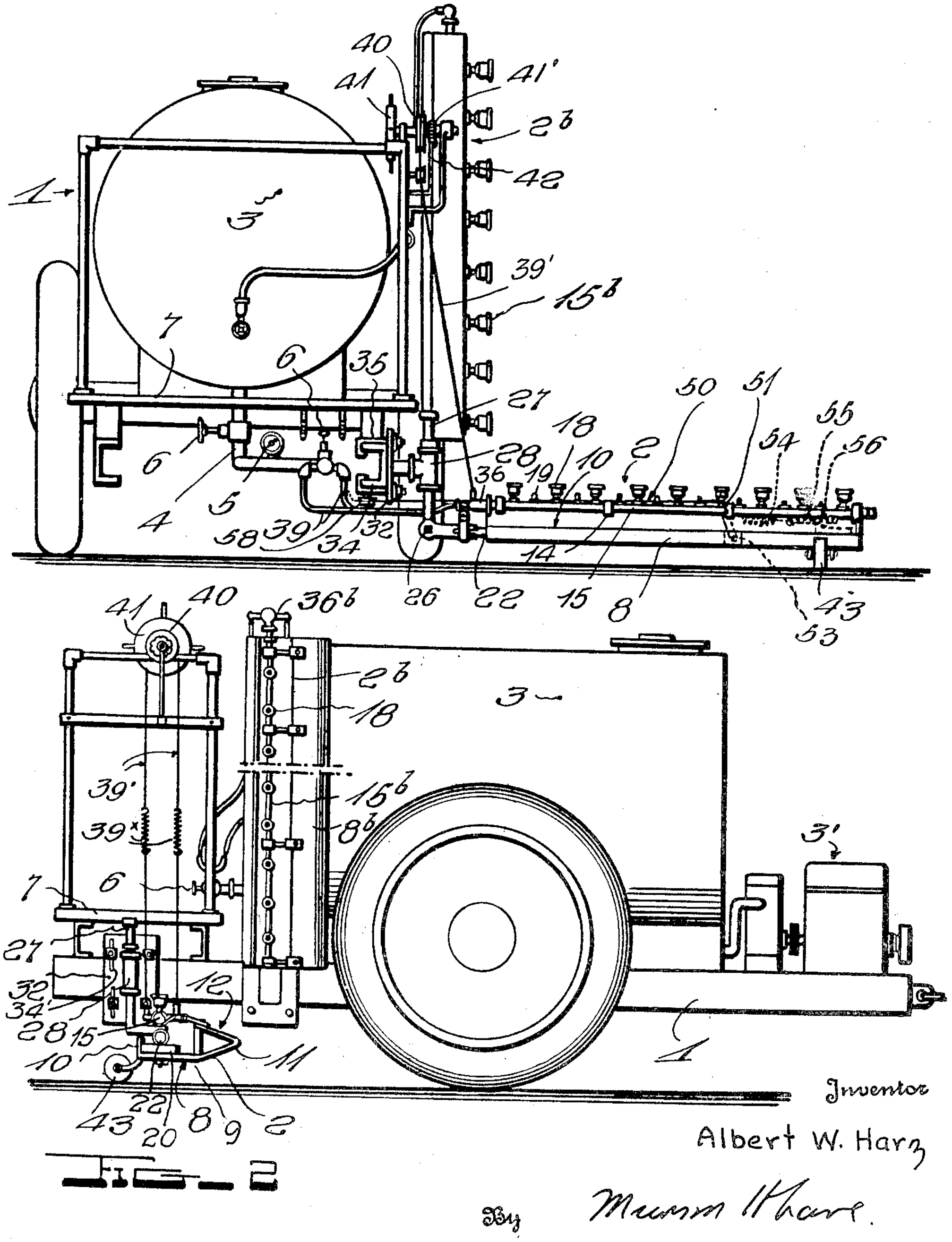
Fig. 1 is an end elevation of a carrier vehicle, showing the application of my improved spray booms thereto.
Fig. 2 is a side elevational view of the same.
Figures 22, 23, 24:
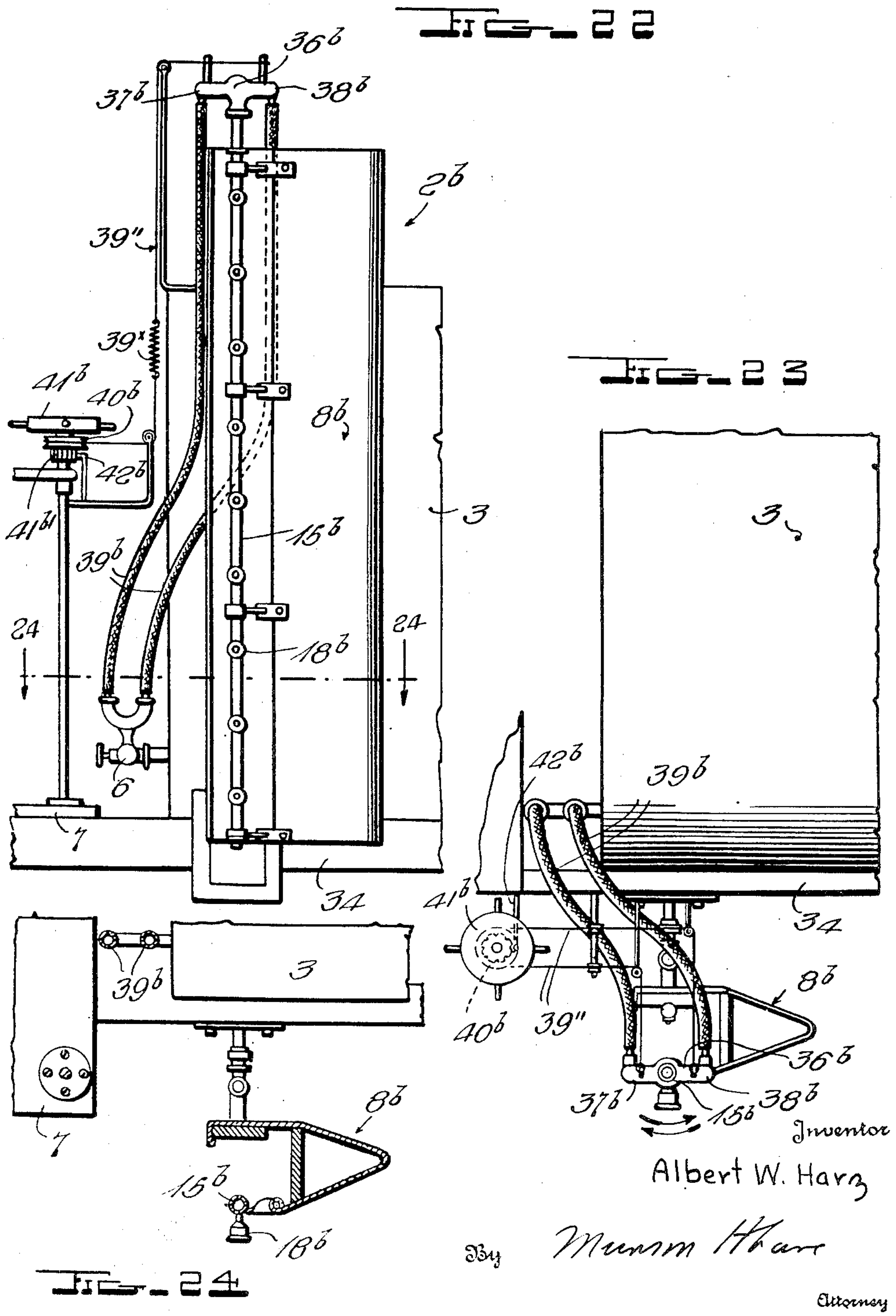
Fig. 22 is a view in side elevation similar to Fig. 1, but showing only the vertical boom structure.
Fig. 23 is a top plan view thereof.
Fig. 24 is a sectional plan view of parts of the structure shown in Figs. 22 and 23.

In Fig. 30 I have shown a modified construction of vertical spray boom 2$^b$ of Fig. 1 and mode of mounting the parts thereof. This boom 2$^d$ comprises a shield 8$^d$, which may be similar to the shield 8$^b$, and which is suitably secured to the solution supply tank, and which supports a spray pipe 15$^d$ carrying nozzles 18$^d$ which may be arranged or formed to discharge at the same angle, or some at different angles from others, as shown. The pipe 15$^d$ is brazed, welded or otherwise fixed or clamped to the inner ends of brackets or links 16$^d$ which are hinged at their outer ends, as at 81, to the guard or shield, thus adapting the pipe and nozzles to be swung or oscillated in a direction longitudinally of the vehicle. In this disclosure the two uppermost nozzles 18$^{d'}$ and 18$^{d''}$ are arranged to discharge at pronounced upward angles of inclination and are coupled by a T-coupling 82 and an elbow coupling 83 to the upper end of the pipe. At its lower end the pipe 15$^d$ is united by branches of a Y-coupling 84 to the eduction ends of the solution supply hose pipes 39$^c$ which are connected at their opposite or induction ends by a similar coupling 84' with the supply tank. In each of the brackets of this coupling 84' is a valve 85 whereby the supply of the solution to the spray pipe may be controlled. Any suitable means may be provided whereby the pipe 15$^d$ may be oscillated alone, or in unison with the spray pipe of a horizontal boom, as shown in Fig. 22. In the present instance the pipe 15$^d$ is shown as provided with a handle 86 whereby it may be manually oscillated by the operator standing on the platform 7.

Figs. 31 to 46 show modifications of the invention in which different forms of guards or shields are employed. In the construction shown in Figs. 31 to 34, inclusive, the boom 2$^e$ comprises a spray pipe 15$^e$ having nozzles 18$^e$ and one or more nozzle receiving outlets closed by plugs 19$^e$. The inner end of this pipe is provided with a coupler head 36$^e$ having elbows or branches 37$^e$, 38$^e$, for connection with hose supply pipes, as in constructions previously described, while at its outer end the pipe is shown as provided with a coupling 82 and nozzle 18$^{d''}$ similar to those shown in Fig. 30. Almost completely surrounding the pipe and nozzles 18$^e$ is a horizontally slotted guard or shield tube 8$^e$ which is brazed, welded or otherwise fixed to the pipe. The slot 14$^e$ in the tube is arranged in line with the nozzles 18$^e$ and the front and rear portions 12$^e$ and 10$^e$ of the tube perform the same functions as the apron 12 and the flange 10 in the structures heretofore described. Fixed to the tube 8$^e$ adjacent its inner end are spaced collars 87 between which is disposed a hanger 46$^e$ having eyes 49$^e$ for pivotal connection with the standard 27. Also located at the inner end of the tube are apertured arms or eyes 88 for connection with the control cables or chains 39'. This construction provides a strong and compact type of boom which may travel close to the ground and over low lying tree branches, and which will at the same time effectually guard the spray nozzles from injury. In this form of the device the spray pipe and shield are mounted to oscillate in unison, as will be readily understood.

Figs. 35 to 37 of the drawings show a construction in which the spray pipe 15$^f$ is enclosed in an outer pipe or casing 89 forming therewith the boom, which parts may be mounted on the post or standard in the same manner as the corresponding parts shown in Figs. 31 to 34, inclusive. The spray pipe 15$^f$ in this construction is composed of sections 90, the adjacent ends of which are united by couplings 91 in which nipples carrying the nozzles $18^f$ are fitted. The pipe 89 is formed with openings 92 through which the nozzles project and each nozzle is surrounded by an individual tubular guard or shield $8^f$, brazed, welded or otherwise fixed to the pipe. The pipes and nozzles are designed in this arrangement to be oscillated in unison in the same manner as the structure shown in Figs. 31 to 34, inclusive. This construction also provides a compact and strong type of boom which adapts the spray pipe, on unscrewing the nozzles, to be easily removed for cleaning, repairs or other purposes, by withdrawing it longitudinally from the pipe 89. These parts likewise may be readily assembled for use by a reversal of these operations.

Figs. 38 to 41, inclusive, are plan and cross-sectional views of portions $15^g$, $15^h$ of a spray pipe, carrying nozzles $18^g$, $18^h$ guarded at the front by individual shields $8^g$, $8^h$, showing, as in the case of the shield $8^f$, how individual shields for protecting the nozzles may be employed. Shield $8^g$ is in the form of a curved plate member, while shield $8^h$ is a member of semicircular form. These shields, which are illustrative of various forms of individual nozzle shields which may be employed, may be brazed, welded or otherwise secured to the spray pipe or, like the shields $8^f$, to an outer pipe 89, where the latter is employed. Such shields may also, if desired, be fastened directly to the nozzles instead of to the pipes. Although for obvious reasons mounting of the shields on the spray pipe or a pipe enclosing the same is preferred.

Figs. 42 to 45, inclusive, show a modified mode of mounting a spray pipe $15^i$ and modified mode of mounting a shield $8^i$ to protect the nozzles $18^i$. As shown, bracket members $16^i$ are here employed which are fulcrumed, as at 93, to and beneath the inner or rear edge portions $17^i$ of the apron $12^i$ of the main shield $8^i$, which may correspond generally in construction to the shield 8 previously described, and the opposite ends of the bracket members are arcuately curved to partly embrace the pipe $15^i$ and are brazed, welded or otherwise fixed thereto. An auxiliary shield $8^{i\prime}$ is provided in the form of a plate extending along the forward portion of the pipe and between the same and the bracket members. This auxiliary shield plate is brazed, welded or otherwise fixed at its inner or lower edge, as shown at 94, to the upper front portion of the pipe and projects outwardly therefrom in front of and to a point substantially coincident with the rim edges of the nozzles. The construction and arrangement of these parts is such that the rim edges of the nozzles and outer edge of the shield lie substantially flush with each other when the pipe is in normal position with the nozzles disposed vertically for an upward discharge action. The construction is also such that when the pipe is tilted upwardly to bring the nozzles to a horizontal position for forward discharge, the nozzles will lie just above and in rear of the upper rear portion $17^i$ of the apron $12^i$ of the main shield $8^i$, and the free edge of the auxiliary shield plate will slightly overlap such portion of the apron. When the pipe is swung downwardly and forwardly to bring the nozzles to a rearwardly discharging position the pipe and bracket members will be disposed beneath the apron $12^i$ of the main shield $8^i$ and the nozzles will be arranged to discharge at an upward and rearward angle over the rear flange of the main shield, as will be readily understood.

Fig. 46 shows a construction similar in all respects to that shown in Figs. 42 to 45, inclusive, except that the free edge of the shield plate $8^{i\prime\prime}$ is curved to form a fender lip $8^k$ which is arranged in advance of or slightly overhangs the forward portions of the mouths of the nozzles and serves to deflect obstructing limbs or vegetation away from the mouths of the nozzles when the nozzles are arranged to discharge upwardly or forwardly.

Fig. 47 shows a staying means which dispenses with the use of a winding mechanism and which is designed to automatically release the boom for swinging movement when coming in contact with an obstruction over which it cannot readily pass. As shown, a stay rope or cable 95 is secured at one end 96 to the outer end of the boom and extends inward and forward horizontally toward the front of the carrier vehicle and is provided at its opposite end with a loop or eye 97 engaging the hooked end 98 of a holding dog 99 pivotally mounted upon the carrier vehicle frame or some other fixed part thereof, said dog being connected by a spring 100 to an adjusting and retaining bolt 101 carried by a bracket 102 on the carrier vehicle frame whereby the cable will be held under tension to prevent rearward swinging movement of the boom unless and until it strikes an obstruction over which it cannot readily pass. When such an obstruction is encountered the resistance of the boom to forward movement as the vehicle travels will cause the dog 99 to move rearwardly and release the cable and prevent forward draft on the boom while the vehicle is being stopped. The mode of mounting the dog 99 in this construction may be in accordance with that shown in Fig. 28. In the use of such a stay construction, which is not employed to lift the boom to an inoperative position, the boom may be manually swung upward when desired and fastened in elevated position by a latch or other suitable fastening means.

Figs. 48, 48*a* and 48*b* show staying means in which a stay cable 50 is suitably fastened at one end 104 to the boom 8 and then extends forwardly and inwardly toward the carrier frame and passes around the guide pulley 58 and thence rearwardly to the guide pulley 59, from which latter it may extend upward and be secured to the drum of a releasing device, such as shown in Figs. 25 to 28, inclusive, or to any other suitable type of releasing means.

Figs. 49 to 54, inclusive, show still another modified form of boom, boom mounting means, and boom controlling means for maintaining the boom in a normal working position and adapting it to yield to prevent injury thereto when encountering an obstruction. As shown, the spray pipe $15^2$ is of comparatively large diameter and carries at its top spray nozzles $18^2$ which may be of any approved form and construction and which may correspond in general form and construction to those previously described. The guards or shields $8^2$ here employed consist of plates disposed at opposite sides of the pipe and nozzles and welded or otherwise secured at their lower edges to the sides of the pipe at a suitable distance above the bottom of the pipe. The pipe and nozzle guarding or shielding means are thus combined to form a boom of unitary construction in which the pipe itself constitutes the body of the boom and whose bottom portion may ride, if desired, in contact with the ground surface. The upper edges of the shield plates $8^2$ are arranged to form a discharge opening for the spray issuing from the nozzles and the outer ends of these plates are spaced throughout so that a discharge outlet is also provided at the outer end of the boom. In this form of the invention the nozzles are inclined to progressively different and increasing degrees in a direction toward the outer end of the boom, so that the spray while discharging upwardly also discharges at an angle toward the trunk of a tree past which the boom is traveling and so that the outermost nozzle will discharge through the outer end outlet directly against the tree trunk, whereby a most efficient spraying action is obtained.

Figs. 49 to 54, as stated, also disclose a modified form of boom mounting means. As shown, the inner end of the pipe extends beyond the inner ends of the shield plates and is mounted in a supporting collar or sleeve 105 held from endwise motion on the pipe by stop collars 106 secured to the pipe by set screws 107. To opposite sides of the sleeve are fastened bracket plates 108 which are pivotally connected at their upper ends by a cross bolt 109 to a bridge piece or saddle 110 fixed to the lower end of the post or standard 27 which is vertically adjustable and rotatably supported on the frame of the carrier vehicle, as previously described, whereby the boom is mounted to swing vertically between operative and inoperative positions and also to swing horizontally and longitudinally of the carrier vehicle. The bridge piece 110 has a rear extension carrying a set screw 111 to engage the sleeve 105 in rear of the pivot bolt 109 whereby the boom may be held rigid and fixed in its working position against downward tilting motion at its outer end. This mounting does not interfere with the free upward and downward swinging movements of the boom to inoperative and operative positions whenever it is desired to swing the boom to either of these positions. The sleeve 105 is provided with apertured lugs or ears 112 to which are fastened the inner ends of stay springs 113, which springs project respectively forward and rearward of the boom and are fastened at their outer ends by connections 114, having turn buckles 115 therein, to the frame or other suitable part of the carrier vehicle. These springs exert opposing pulling actions on the boom to hold it in a normal working position, which may be at right angles to the line of travel of the carrier vehicle, but by variably tensioning the springs by means of the turn buckles the boom may be disposed to work at an angle greater or less than a right angle, as will be readily understood. These stay springs also permit the boom to swing or yield rearwardly when encountering an obstruction over which the boom cannot readily pass, to prevent injury to the boom, and will then operate to return the boom to normal position after the obstruction is passed.

It will be understood that by mounting the boom to have vertical sliding movements and by the use of an automatic releasing device the carrier frame and boom are adapted to have relative movements to increase the safety of operation of the boom, not only as against injury by contact with obstructions, but also against injury when the wheels of the carrier vehicle drop into a hole or ditch. While other equivalent means for the purpose may be used, it will be seen that the constructions described provide means of a simple, reliable and effective character to permit either the carrier frame or boom to drop without injury to the boom, as the boom may move either upwardly or downwardly relative to the carrier frame in case either the frame or the boom drops temporarily below its normal working level. This feature of the invention is of importance in permitting practical and successful operation of a horizontal boom on non-level surfaces or where depressions and elevated obstructions are liable to be encountered. In place of the releasing devices disclosed a spring-held type of holding and releasing latch may be used as part of the boom supporting means which may be manually or automatically retracted or disconnected for a releasing action.

Fig. 55 shows the use of another form of vertical boom designed to direct the spray horizontally outward and at an angle upwardly from a high level in order that all branches as well as the trunk of even a tall tree may be reached. The boom $2^{b'}$ here shown may be of any of the forms previously described and mounted in any preferred manner either as a stationary boom or as an oscillatable boom. As shown it comprises a main vertical body portion 121 and an upper inwardly and upwardly curved portion 122 respectively carrying nozzles 18 to direct the spray outward horizontally and outwardly and upwardly at an angle. It is mounted in bearings 123 and 124 to oscillate forwardly and rearwardly and provided with a handle 125 for oscillating it. Flexible pipes 126 and 127 are connected at low and high levels with the body portion of the boom pipe for supplying the spray thereto, preferably under high pressure, i. e., from 600 to 800 pounds and upward. A main valve 128 is provided to control the supply of spray liquid from the tank to the pipes. A valve 129 may be provided at the top of the pipe portion 121 to limit the supply of liquid to the nozzles carried by this part of the pipe, a valve 130 (preferably a gate valve) may be provided to limit the supply of liquid to the nozzles of the lower portion of the part 122 of the pipe, and a valve 131 may be provided to limit the supply of liquid to nozzles below it but to cut off the supply of liquid to nozzles above it, so that the discharge may be regulated according to the height of the tree which is to be sprayed. This type of boom allows trees of different heights to be effectively sprayed without increasing the overall height of the vehicle or boom.

Fig. 56 shows a boom equipped with a detachable grass fender or guard which sweeps aside grass or other growing vegetation to prevent interference thereof with the free discharge of spray from the nozzles onto the trees to be sprayed. As shown, a carrier board or body 132 has arranged on its bottom a shoe plate 133 which projects in advance thereof, as shown at 134, and then upwardly and backwardly on itself, as shown at 135, to form a V-shaped fender or guard, said parts being united by bolts or rivets 136. The rear edge of the body 132 is arranged in advance of the boom pipe 15 and its nozzles and nozzle guards and the boom 15 are secured thereto at intervals by clips 137, each having arms 138 fastened to the body 132 by the rear bolts or rivets 136 and jaws 139 arranged to receive and engage the boom pipe and held in place by cotter pins or like fastenings 140, on the removal of which the fender may be detached. This construction allows ready and convenient application and removal of the fender as required.

Fig. 57 shows another detachable type of fender which may be used and which comprises a bar, rod or pipe 141 detachably connected at its ends by chains or like flexible connections 142 to the ends of the boom and having arms 143 detachably connected at 144 to collars 145 loose on the boom whereby the fender may have independent up and down motions. This fender, like the fender shown in Fig. 56, may be applied whenever it is necessary to use it to ward away grass from the nozzles.

Each of the fenders shown in Figs. 56 and 57 may be connected to the vehicle by a stay rope, chain or cable 146 which will operate to hold the boom against backward swinging movement. This stay may be connected to the vehicle by a releasable fastening or hitch which will release the boom when the latter encounters an obstruction over which it cannot ride or pass without liability of injury. The fastener or hitch may be similar to that shown in Fig. 47, but I may employ one of the type shown in Fig. 58. This consists of a latch bar 147 on the cable adapted to be fitted within a keeper 148 on the vehicle frame, which keeper includes a keeper bar 149, a vertically adjustable screw 150, and a spring 151 having tensioning means such as a nut 152 carried by the screw to permit insertion and release of the bar 147. The bar 147 is provided with a V-shaped locking tooth 153 to engage a correspondingly shaped locking recess 154 in the bar 149 in which the tooth is held seated by the spring action when the bars are engaged. The engagement is sufficiently secure to hold the bar 147 locked until the pull on the stay, due to an arrest of motion of the boom by an obstacle, is sufficient to overcome the locking pressure of the spring, whereupon the bar 147 will be released to stop the forward travel of the boom and allow the forward travel of the machine to be arrested to prevent injury to the boom.

The fenders and outer end of the boom may be provided with shoes to prevent them from digging into the earth when an endwise movement of the machine occurs, as when backing up and going forward again.

Fig. 59 shows a construction in which a detachable spray connection or extension 155 in the form of an elbow pipe may be applied at the outer end of the boom pipe to extend its spray range. This extension may be screwed or otherwise fitted on the boom pipe so as to extend outwardly beyond the nozzle guard or guards with its projecting end extending upwardly and outwardly at an angle This end of the elbow is provided with apertures or nipples 156 arranged to project a fan-shaped spray beyond the boom to cover the trunks of trees which cannot be reached by spray from the nozzles. Between this spray extension and the boom pipe one or more pipe lengths 157 may be inserted to extend the length of the boom if greater distances are to be covered. When the extension and extra pipe length or lengths are removed the outer end of the boom pipe may be closed by a cap or plug.

Fig. 60 shows in section a construction such as is shown in plan in Fig. 49 in which one or both nozzle guards $8^2$ (if two are employed) are provided with slots or openings 158 to admit air to the space or spaces between the boom pipe $15^2$ and the guard or guards to control the spread of the spray from the nozzles $18^2$. During the spraying action air will rush in through these slots or openings and the streams of air striking the spray streams, which tend to swirl or fan out or diverge as they leave the nozzles, and cause them to take a straighter outward course whereby the spray will be projected a greater distance and particles of spray prevented from dripping on the ground in the immediate vicinity of the boom and being thereby wasted.

In Figs. 61 to 73, inclusive, I have shown a preferred form of ground engaging under tree spray boom slidably mounted at the rear of a carrier vehicle, shown as also equipped with right and left hand upright sprayers, one or both of which may be operated simultaneously with the under tree spraying boom, though in general when a left hand under tree spray boom is mounted to extend to the left of the vehicle, as indicated in Fig. 61, only the left hand upright spray boom will be operated, while when a right hand under tree spray boom is mounted to extend to the right of the vehicle, as viewed from the rear, only the right hand upright spray boom will be operated in conjunction therewith. It will be understood that in the arrangement described above right and left hand horizontal spray booms will be required, but all the elements would be alike whether the boom is a right hand or a left hand boom.

As shown, the carrier vehicle is generally designated by the reference numeral 1001 and carries at the rear thereof a large capacity spray tank 1002 which may be considered as part of the carrier vehicle and which may be equipped with suitable pumping means capable of forcing spray through the nozzles of the upright and horizontal spray booms 1003 and 1004 under high pressure.

The horizontal or ground engaging under tree spray boom 1004, which corresponds generally with the spray boom 2 disclosed in Figs. 1 to 16, is in the present embodiment of the invention carried by a bracket member 1005 which is slidably adjustable along a channeled transverse frame member 1006 located at the rear of the spray tank 1002 near the bottom thereof. This frame member is secured at its ends to the rear ends of the side frame beams which support the tank and intermediate its ends is spaced a slight distance from the tank body. The bracket member 1005 is provided with top and bottom flanges 1007 which extend over the flanges of the frame member and are connected by bolts 1008 or other suitable fastenings whereby the bracket member may be clamped to or released from the frame member. This permits the bracket 1005 and the horizontal spray boom 1004 carried thereby to be adjusted laterally with reference to the carrier vehicle and makes possible the use of horizontal booms of standard length even though the tree spacing may vary in different orchards or in different parts of a single orchard.

As shown, the horizontal boom 1004 comprises an elongated channeled or trough-shaped guard or shield member 1009 in which is arranged a spray pipe 1010 with which communicate a plurality of spaced upwardly and outwardly directed spray nozzles 1011. These nozzles are spaced at varying intervals and are inclined at varying angles, those close to the inner end of the boom being more widely spaced apart and being directed upwardly at a greater angle to the horizontal than those nearer the outer end of the boom. The upturned front and rear longitudinal edges of the shield member 1009 form fenders or guards to protect the pipe and nozzles from injury in the travel of the boom in contact with tree limbs and other obstructions.

At its outer or free end the shield 1009 is provided with a reinforcing and wear shoe 1012 which allows the boom to slide freely in all directions in contact with the ground and which is shaped at its outer end to form a V-shaped slot 1012′ for the substantially horizontal projection of spray therethrough. At its inner end the boom shield is provided with a supporting and wear stirrup 1013 which is pivotally connected by a bolt 1013′ (Fig. 73) with the lower end of a supporting post 1014 to swing outwardly and downwardly to working position, as shown in Fig. 61, or upwardly and inwardly to an upright inoperative position, as shown in Fig. 71. This bolt passes through openings in ears at the top of the shield and at the lower end of the post and is desirably provided at one end with a hand wheel 1013$^{a}$ and at its opposite end with a retaining nut 1013$^{b}$ whereby it may be manipulated and held in adjusted position to clamp the boom to the post or release it therefrom. A rod 1013$^{c}$ (Fig. 73) is welded to the nut and engaged with the shield to lock the nut and hold it from turning. The post 1014 extends through and is rotatably and vertically slidable in a sleeve 1015 arranged between and fixed to spaced cheek plates 1015$^{a}$ projecting from a carrier plate 1015′ fastened to the bracket member 1005, whereby the horizontal boom is mounted to move bodily up and down relatively to the vehicle without injury in the travel of the vehicle and boom over irregular ground surfaces, and such mode of mounting also adapts the boom to swing in a horizontal arc longitudinally of the vehicle with the post as a pivot as well as to swing up and down on its horizontal pivot bolt axis 1013′ in order to prevent injury to the boom and allow it to be raised to a vertical inoperative position, as hereinafter described.

A collar 1016 applied to the post is provided for engagement with the upper end of the sleeve to limit the downward movement of the post and pivoted end of the boom, and this collar may be adjusted to regulate the working height or level of the boom with relation to the ground surface. To this end the collar is adapted to be secured in position by a set screw or fastening pin 1016′ engageable with the surface of the post or any one of a series of recesses or openings 1016$^{a}$ therein to positively lock the collar in a set position. A locking pin 1017, coupled by a flexible loss-preventing connection 1018 with the post, may also be provided for passage through openings 1019 in the sleeve and engagement with an opening 1020 in the post to assist the collar in sustaining the weight of the boom and to lock the post against rotation when the boom is swung upwardly to its vertical inoperative or non-working position.

The boom may be raised to its non-working position by means of a cable fragmentarily indicated at 1021 (Fig. 61) or other suitable raising and lowering means. In case of the use of a cable, as shown, the cable may extend from the boom to the front or other suitable point of the carrier vehicle for manual operation or for operation by hydraulic power or other suitable power means, and the arrangement may be such that the raising and lowering means will further assist in holding the boom in raised position.

In the present instance I have shown the use of fastening means for holding the boom in raised position, the same comprising a cap 1022 arranged at the top of the post 1014 and provided with an apertured keeper lug 1023 which is adapted to pass through a slot in a latch member 1024 on the boom shield when the boom is raised and to receive a fastening pin 1025 connected with the cap by a flexible loss-preventing connection 1025′, whereby the keeper lug and latch plate may be connected to hold the boom in raised position. In this connection it will be observed that the pivotal connection 1013′ between the stirrup 1013 and lower end of the post is offset or projects upwardly from the inner end of the boom sufficiently to permit the boom to swing upwardly to a vertical position parallel with the post (Fig. 71), so that the weight of the raised boom will be properly sustained by the post and its supporting means, and to bring the fastening elements 1023 and 1024 into accurate registry for fastening connection.

The means for supplying spray solution from the tank 1002 to the booms 1003 and 1004 comprises pipes 1026 and 1027 (Figs. 63 and 67) terminating at their discharge ends at the rear of the right hand side of the vehicle and a pipe 1028 terminating at its discharge end at the rear of the left hand side of the vehicle, which pipes extend rearwardly beneath the tank (Fig. 68) from a supply pipe 1029 suitably located at the front of the vehicle and connected with a pump diagrammatically indicated at 1072 (Figs. 63 and 67) which communicates with the tank and supplies the solution to the pipes under a desired pressure. As shown, the pipes 1027 and 1028 are provided with control valves 1029′ which may be operated through suitable control means 1070 by the driver of the vehicle or an attendant, whereby the flow of the solution to the pipes and booms may be controlled and regulated. The pipe 1026 is shown provided with a valve 1029″ which may also be remotely controlled if desired. Pipes 1026 and 1028 are suitably connected at their rear ends with the right and left hand vertical booms 1003 while the pipe 1027 is connected at its rear end by a hose pipe 1030 with a fitting at the inner end of the spray pipe 1010 of the boom 1004. The arrangement is such that each of the booms may be supplied with fluid and used independently of the others or either of the vertical booms 1003 may be used with a suitable right or left hand horizontal boom disposed at the same or different side of the vehicle.

The horizontal pipe 1010 may be adjustably supported in the shield member 1009 by a hanger or shield plate 1009′ (Fig. 73) to which it is welded and which is pivotally suspended from the upturned front of the shield member 1009 by suspension members 1010′ similar to butt hinges, whereby the pipe is mounted for swinging movements so that the spray nozzles may be angularly adjusted to throw the spray upwardly or forwardly at a desired angle of inclination. To this end I provide at the inner end of the pipe adjusting means for adjusting the pipe and holding it in adjusted position comprising an adjusting bolt having at one end an eye 1031 embracing the nut and having a threaded shank 1032 passing through an opening in the shield and fitted with adjusting and check nuts 1033 on the stirrup 1013 whereby the pipe may be swung to shift the nozzles from a central vertical working position to a desired angular or inclined working position. It will, of course, be understood that adjusting means of the type previously described or other adjusting or oscillating means suitable for the purpose may be employed, whereby the spray pipe may be oscillated or adjusted about a longitudinal axis.

A stay attachment is provided at the rear of the boom 1004 to limit its forward swinging movement beyond normal spraying position, as, for example, during backing or reverse movement of the vehicle. This comprises a stay chain or cable 1034 attached at one end to the rear of the boom shield 1009 and at its opposite end to an arm 1034' on the bracket member 1005 (Figs. 61, 63 and 66). This chain or cable may be detachably connected with the shield 1009 and bracket 1005 so that it may be removed with the boom when the latter is detached from the vehicle, and readily attached whenever the boom is applied to the vehicle. If desired a stay spring may be substituted for the cable or chain 1034 similar or equivalent to the stay spring 113 shown in Figs. 49 and 51 previously described.

A safety stay and releasing means or hitch (Figs. 61, 63, 68, 69 and 70) connecting the boom 1004 with the vehicle is also provided to limit or prevent the rearward swinging movement of the boom beyond normal spraying position and to release the boom to permit it to swing rearwardly to prevent damage thereto in the event that it should strike an obstruction over which it cannot freely ride. Parts of this safety stay and releasing means also serve the function of a sweep to push aside tall grass, debris and the like in advance of the boom as the vehicle moves forwardly to prevent interference by such materials with the free discharge of the spray against the trees being sprayed. Still another function performed by such means is to provide for a relative compensating movement between the vehicle and a part of the releasing means to prevent the same from becoming entangled with an adjacent vehicle wheel when the boom is released and swings backward. As shown, a flexible bridle or yoke chain or cable 1035 extends longitudinally of the shield 1009 and is attached at its outer and inner ends to the ends of the shield and is of greater length than the distance between such points. A second stay and tow cable 1036 extends forwardly from the cable 1035 and at a diagonal angle between the boom and forward portion of the vehicle and is connected at its rear end to the cable 1035 and at its forward end to a safety holding and releasing device 1037 located at the forward end of the vehicle. The point of connection of the cable 1036 to the cable 1035 is adjacent to but a distance inwardly from the outer end of the latter so that when the parts are in normal working position the cable 1035 is drawn forward under tension and held taut by the device 1037 and is arranged to provide relatively long and short sections or sweep portions 1038 and 1038' connected to each other and to the stay by a triangular equalizer coupling plate 1038ᵃ which are inclined at diagonal angles to the path of travel of the boom and in its plane, the arrangement of the cable portions 1036, 1038 and 1038', and particularly the cable portions 1038 and 1038', thus being such that in the forward travel of the vehicle the said portions will act as sweeps to push aside any tall grass, debris or the like out of the path of the spray nozzles and spray issuing therefrom, and also equalize stress to relieve post 1041 of undue stress.

The holding and releasing device 1037 is shown in detail in Figs. 68, 69 and 70 and comprises a bracket 1039 mounted on the front portion of the vehicle frame and extending longitudinally thereof, a latch plate member or keeper 1040 located at the forward end of the bracket, a tubular latch carrier arm or member 1041 hinged or pivotally mounted at its rear end, as at 1042, at the rear of the bracket to swing outwardly and inwardly, laterally of the bracket and vehicle, and carrying at its forward end a latch bolt 1043 projectable by a spring 1044 and which is slidably mounted at its rear end in the member 1041 and has its forward or free end formed to engage a keeper slot or opening in the latch plate 1040 and interlock therewith when the carrier member and bolt are disposed in their normal holding positions longitudinally of the bracket. A return spring 1045 is connected at its rear end to an arm 1046 near the hinged end of the member 1041 and at its forward end to an eye-bolt 1047 secured to a bracket member 1071 hingedly mounted on the side of the vehicle 1001. The eye-bolt is provided with adjusting nut 1047' for adjusting spring tension. The spring 1045 serves to yieldingly resist the outward swinging movement of the member 1041 and to normally hold the same and the bolt in latching position. A nut 1048 on the bolt 1043 is provided to regulate the tension of the spring 1044 and its resistance to the retraction of the bolt 1043. The bolt 1043 is adapted to be retracted against the adjusted resistance of the spring 1044. This spring is arranged on the bolt between a washer 1049' engaging a collar or flange 1049 on the member 1041 and a washer 1050 bearing against the nut 1048 on the bolt, whereby the tension of the spring 1044 may be regulated. The enclosed portion of the bolt is provided with a lug or projection 1051 which extends outward through and is slidable in a slot 1052 in the member 1041, and a trip member 1053 is provided to engage this lug and control the movements of the bolt. This member 1053 is in the form of a cam plate pivoted to the member 1049 to swing to a position to retract the bolt against the resistance of the spring 1044 or to a position to permit said spring to project the bolt. The cam member 1053 is connected with the forward end of the cable 1036 and is provided with a series of openings 1054 arranged at different distances from its pivot and with any one of which the cable 1036 may be engaged to regulate the cable pull on the cam member required to release the bolt to permit the bolt and its carrier member to swing outward to a releasing position. The lug 1051 is provided with an opening 1051' to permit it to be directly connected with the cable 1036 if desired.

Normally the strength of the springs 1044 and 1045 is sufficient to hold the bolt from retraction and its carrier member from outward swinging movement against the resistance to travel of the boom 1004 and its tendency to swing rearwardly, so that the boom will be held against rearward swinging movement and in a normal working position substantially at right angles to the vehicle. When, however, the boom strikes an obstruction over which it cannot pass without liability of injury its lag or stoppage will cause a pull on the cable 1036 sufficient to overcome the resistance of the spring 1044 and release the bolt and also to cause the bolt and its carrier member to swing outward, more or less, against the resistance of the spring 1045, by which the traction pull on the boom will be arrested and the boom allowed to have relative rearward swinging movement to prevent injury thereto. As the releasing movement of the bolt is longitudinal under the cable pull a reliable and sufficiently sensitive action thereof is insured, and as its release is followed by a swinging movement of the bolt with its carrier member or arm 1041 a timing action is effected which allows forward travel of the vehicle for a period to enable it to be stopped by its driver without injury to the boom or obstruction. Another advantage of this sidewise swinging movement of the bolt and its carrier is that it gives a compensating action when the boom swings rearward to move the cable 1036 outward so as to prevent the cable from becoming entangled with the adjacent rear wheel of the vehicle.

The latch plate member 1040 provides a safety latch element which is movable independently of the bolt to free the bolt for a boom releasing action. As shown, this member 1040 is hook-shaped and pivoted at one end as at 1055 to the bracket 1039 and extends above and transversely of the forward end of the bolt 1043 and has a relatively heavy or weighted free end 1056 provided with a beveled nose portion 1057 and a keeper opening or slot 1058. This slot opens downward through the bottom of the latch member which is supported in latching position by a fixed abutment 1059 on the bracket 1039, in which position the slot 1058 aligns with and receives the free end of the bolt 1043. The member 1040 is adapted to be swung upwardly to unlatch the bolt by suitable means, such as a manually operable cable or rod connection 1060, and is movable by gravity back to closed position. By operation of the connection 1060 the driver of the vehicle or an attendant may retract the member 1040 to disengage it from the bolt to effect the release of the boom to allow it to swing rearwardly in case of an emergency without waiting for the automatic releasing means to act or in the possible event of failure of the latter to act, thus insuring still greater safety against injury to the boom in the operation of the apparatus. After a pull on the connection 1060 to retract the latch member 1040 the connection is released, allowing the latch member to return to closed position so that when the boom is returned to normal position the bolt will be returned to normal position by the action of its springs, in which action the free end of the bolt will engage the beveled nose 1057 to raise the latch to allow the bolt to reengage the slot 1058, whereupon the latch will tilt downwardly to closed position to hold the bolt locked.

The return spring 1045 may be strong enough to swing the boom 1004 and bolt 1043 after a releasing action back to their normal positions when the boom clears an obstruction and while the vehicle is traveling forward, but this is undesirable, as the boom may strike and damage or be damaged by other obstructions lying in its path. It is preferable in such an operation to stop the forward motion of the vehicle and back it until the boom again assumes a normal working position relative to the vehicle and to make the return spring 1045 just strong enough to take up the slack in the string 1036 and return the bolt 1043 to latched position, which avoids the necessity of using a return spring of great strength.

It will be observed that the horizontal boom, comprising the boom proper, spray pipe 1010, shield member 1009 and its supporting bracket, sleeve and post, constitutes a self-contained unit which is applicable to and removable as such from the vehicle frame. Also, it will be observed that the safety hitch or releasable retaining means for releasably holding the boom in working position is a self-contained unit mounted by a bracket on the machine frame. This unitary construction of the boom and safety hitch devices permits of their ready assemblage for application to the vehicle and removal therefrom for general overhauling, repairs or other purposes, although, if desired, the safety hitch bracket may be welded to the machine frame as parts of the latch mechanism carried thereby are readily accessible for repairs or replacement when required without removing the device as a unit from the vehicle frame. It will further be understood that the pump used to supply the spray solution to the booms may be suitably located at the rear of the vehicle, and that the piping, control valve means and connections employed to control or govern the supply of the spray solution to the booms may be of any suitable construction to allow the solution to be supplied separately or conjointly to the booms and by the use of remote controlled or other suitably operated valve devices. I may also provide means for supplying air under compression to the horizontal boom to amplify the spray force and project the spray to any desired height with any desired force against the trees, thereby increasing the effectiveness of the force of the spray in assisting in lifting low hanging limbs and fruit over the boom in the travel of the latter. Hydraulic or other power means may also be used to raise and lower the horizontal boom and hold the boom in raised position.

While the bridle and stay parts are preferably formed of flexible cables, chains or springs, these parts may in practice consist of rods or the like. The described or an equivalent arrangement of these parts is, however, preferred and is of advantage and importance in adapting them to function as sweeps to push aside grass, low-hanging branches, fruit, prunings and debris generally from in front of the horizontal boom or out of the path of the spray nozzles to prevent injury to the nozzles or interference with the discharging spray. The use of such parts in connection with a safety hitch having an adjustable tension spring or springs is also advantageous in order that the resistivity of the hitch to boom release may be varied as required. When the ground is free of grass little tension is required, but when the grass or cover crop is high the spring tension must be increased to hold the boom in working position against frequent release under cover crop resistance alone, as will be readily understood. It will be apparent that when the hitch is released the tension on the two stays is reduced to that of the return spring 1045, which insures a high degree of safety against damage to tree trunks and bark should the hitch be released when the machine is turning, as at the end of a row. In place of the return spring 1045, a hydraulic ram may be used to return the hitch to normal position after release, in which event the tension on the stay would be nil when the hitch is released.

It will be further apparent that the spray pipe 1010 may be the fixed or non-oscillating type, or may be adjustable as indicated in Fig. 73, or suitable means may be employed similar to that disclosed in the embodiment of the invention described in Figs. 1 to 16 for oscillating or adjusting the pipe about a horizontal longitudinal axis.

Other modifications and variations will be apparent to those skilled in the art.

I claim:

1. An ambulant tree spraying apparatus comprising a carrier vehicle, supply means for liquid spray carried by the vehicle, an elongated spray boom extending laterally from a portion of the vehicle at substantially ground level, said boom including a spray pipe communicating with said supply means, means hingedly connecting the boom at its inner end to permit swinging movement in a horizontal plane, stay means comprising a flexible cable connecting the outer end of the boom to the vehicle at a point in advance of the hinge connection for normally preventing rearward movement of the boom about its pivot, and means comprising a releasable catch adjacent the point of attachment of the cable to the vehicle for releasing said boom when an obstruction is encountered.

2. In a tree spraying apparatus, a carrier vehicle, a horizontally disposed under three spray boom carried by the vehicle at substantially ground level and mounted to swing longitudinally of the vehicle, said boom being provided with a longitudinal series of spray nozzles and a fender extending longitudinally of the boom in advance of the nozzles, a stay for connecting the boom with the vehicle to normally hold the boom against swinging movement and at a desired working angle to the vehicle, said stay extending diagonally in a horizontal plane being secured at one end to said fender and at the other end to the vehicle at a point in advance of the point of attachment of the boom, and a releasable fastening adjacent the vehicle operating when an obstruction is encountered which offers a predetermined resistance to the travel of the boom to release said stay from the vehicle.

3. An ambulant tree spraying apparatus comprising a carrier vehicle, a source of liquid spray material under pressure comprising a spray liquid storage tank and pump carried by the vehicle, an elongated horizontal under tree spray boom, extending laterally from a portion of the vehicle at substantially ground level whereby said boom is adapted to pass beneath overhanging boughs of trees, said boom including a spray pipe having upwardly directed spray nozzles, and a shield extending lengthwise of the pipe in front of the nozzles, means slidably connecting the spray boom to the vehicle to permit the boom as a whole to move up and down relatively to the vehicle in its travel over irregular ground surfaces, and means including a flexible portion independent of said slidable boom connection, connecting said source of liquid spray under pressure with the spray pipe whereby spray liquid under pressure may be forced from said tank discharged through said spray pipe.

4. An ambulant tree spraying apparatus comprising a carrier vehicle, an elongated horizontal spray boom extending laterally from a portion of the vehicle at substantially ground level, and means yieldingly connecting the spray boom to the vehicle to permit the boom to move bodily up and down relatively to the vehicle in its travel over irregular ground surfaces, said spray boom being hingedly connected at its inner end to swing about a horizontal pivot to permit the outer end of the boom to be moved upwardly to a raised inoperative position, and actuating means for swinging said boom about said horizontal pivot.

5. An ambulant tree spraying apparatus comprising a carrier vehicle, an elongated horizontal spray boom extending laterally from a portion of the vehicle at substantially ground level, and means yieldingly connecting the spray boom to the vehicle to permit the boom to move bodily up and down relatively to the vehicle in its travel over irregular ground surfaces, said spray boom being hingedly connected at its inner end to swing about a horizontal pivot to permit the outer end of the boom to be moved upwardly to a raised inoperative position, actuating means for swinging said boom about said horizontal pivot, and means for securing the end of the boom remote from the horizontal pivot when in raised position.

6. An ambulant tree spraying apparatus comprising a carrier vehicle, an elongated horizontal spray boom extending laterally from a portion of the vehicle at substantially ground level, and means yieldingly connecting the spray boom to the vehicle to permit the boom to move bodily up and down relatively to the vehicle in its travel over irregular ground surfaces, said boom including an elongated spray pipe having spray nozzles; and ground engaging guard members for protecting said spray pipe and nozzles.

7. A spraying apparatus as set forth in claim 6, wherein the spray nozzles are directed at varying angles along the pipe.

8. An ambulant tree spraying apparatus comprising a carrier vehicle, a spray liquid storage tank and pump carried by the vehicle, an elongated horizontal under tree spray boom including a spray pipe, extending laterally from a portion of the vehicle at substantially ground level whereby said boom is adapted to pass beneath overhanging boughs of trees, means slidably connecting the spray boom to the vehicle to permit the boom as a whole to move up and down relatively to the vehicle in its travel over irregular ground surfaces, and connections between said tank, pump and spray pipe whereby spray liquid under pressure may be forced from said tank through said spray pipe, said carrier vehicle including a rear cross member, and the spray boom being adjustably mounted on said cross member to permit adjustment for varying tree widths.

9. A tree spraying apparatus as set forth in claim 6, wherein means are provided for angularly adjusting or oscillating the spray pipe with reference to the central axis of the spray pipe.

10. An ambulant tree spraying apparatus comprising a carrier vehicle, a spray tank carried thereby, an upright spray pipe secured at the rear of the tank and connected therewith and having outwardly directed spray nozzles, a laterally extending ground engaging horizontal spray boom including a spray pipe extending lengthwise of the boom, means slidably connecting the spray boom at the rear of the tank to permit the horizontal boom to move bodily up and down with reference to the upright spray pipe to compensate for irregularities in the ground surface, said means including a sleeve member connected to the vehicle frame, and a vertical post member carried by said horizontal boom and extending through the sleeve, and conduit means separate from the slidable connections between the spray boom and tank connecting said upright and horizontal spray pipes to the interior of the tank.

11. An ambulant tree spraying apparatus comprising a carrier vehicle, a source of liquid spray material carried by said vehicle, a horizontal spray boom extending laterally from the vehicle and hingedly connected thereto at its inner end about an upright axis to permit arcuate swinging in a horizontal plane, said spray boom including a spray pipe and a guard fender having a portion extending in advance of said pipe, conduit means including a flexible portion connecting said source of liquid spray material and said pipe, and a cable extending diagonally from an outer portion of the boom to the vehicle in a substantially horizontal plane in advance of the point of connection of the inner end of the boom with the vehicle, said cable serving also to push aside grass, debris and the like in advance of the boom as the carrier vehicle is moved forwardly.

12. An ambulant tree spraying apparatus comprising a carrier vehicle, a horizontal spray boom extending laterally from the vehicle and hingedly connected thereto at its inner end to permit arcuate swinging in a horizontal plane, a releasable flexible diagonal connection between the boom and the vehicle extending at a low level from an outer portion of the spray boom to a portion of the vehicle in advance of the point of connection of the inner end of the boom with the vehicle, said diagonal connection serving to push aside grass, debris and the like in advance of the boom as the carrier vehicle is moved forwardly, and a flexible stay connection secured to the rear end of the boom to limit forward swinging movement of the boom.

13. An ambulant tree spraying apparatus comprising a carrier vehicle, an elongated spray boom adapted to extend laterally from the vehicle, means at the inner end of the boom connecting the same to the carrier vehicle to permit swinging movement of the boom in a horizontal arc, releasable means normally holding the boom in laterally extending working position while permitting the same to swing rearwardly when the boom meets an obstruction, and means for automatically returning the boom to normal working position after passing said obstruction.

14. An ambulant tree spraying apparatus comprising a carrier vehicle, a source of spray liquid under pressure mounted on the carrier vehicle, an elongated horizontal ground engaging under tree spray boom adapted to extend laterally from a portion of the vehicle and including a pipe having generally upwardly directed spray nozzles adapted to direct spray fluid upwardly from beneath a tree, means slidably connecting the spray boom to the vehicle to permit the boom to move bodily up and down relatively to the vehicle on its travel over irregular surfaces, conduit means including a flexible portion independent of the slidable means connecting the spray boom to the carrier vehicle, for connecting the source of spray liquid to the spray nozzles of the horizontal boom, and means separate from the horizontal spray boom for applying liquid spray to the outer portion of the tree.

15. An ambulant tree spraying apparatus comprising a carrier vehicle having a transverse spray boom attaching member extending across the rear end thereof, said member being rigidly secured to the vehicle at its ends but spaced slightly therefrom intermediate the ends, a bracket member adjustably mounted on said transverse member having means for adjustably securing the same at any desired position along said member, and a spray boom assembly secured to said bracket and extending laterally therefrom, said assembly being capable of lateral adjustment with reference to said transverse member whereby the boom may be adjusted to extend laterally any desired distance beyond the carrier vehicle to permit the apparatus to be used for spraying rows of trees of varying width with a single spray boom.

16. An ambulant tree spraying apparatus comprising a carrier vehicle, supply means for liquid spray carried by the vehicle, an elongated horizontal spray boom mounted at one end for extension laterally from the vehicle and to swing longitudinally of the vehicle about a vertical axis, said boom including a spray pipe having upwardly directed spray nozzles, a fender portion in advance of said nozzles, conduit means including a flexible portion independent of the connection of the boom to the vehicle, for connecting said spray pipe to said spray supply means, and automatically releasable retaining means for normally connecting the boom with the vehicle to hold the boom in laterally extending position and operative under stress on the boom when the boom meets with an obstruction to permit the boom to swing about its vertical axis.

17. For use with an ambulant tree spraying apparatus comprising a carrier vehicle, an elongated horizontal spray boom mounted at one end for extension laterally from the vehicle and to swing longitudinally of the vehicle about a vertical axis; a stay extending from the boom at or near the free end of the boom toward a portion of the vehicle forward of the boom, and a yielding spring-held connection between the stay and vehicle normally operating to hold the boom in laterally extending position and operative under stress on the stay when the boom meets with an obstruction to release the stay to permit the boom to swing about its vertical axis.

18. An ambulant tree spraying apparatus comprising a carrier vehicle, supply means for liquid spray carried by the vehicle, an elongated horizontal spray boom including a spray pipe connected with the supply means, said boom being mounted at one end for extension laterally of the vehicle to swing longitudinally and slide vertically about a vertical axis and to swing to a raised vertical position about a horizontal axis, releasable latching means for holding the boom in raised position, and releasable retaining means for normally holding the boom in laterally extending position while permitting the same to slide on its vertical axis and to swing on its horizontal axis and operative to release the boom to permit it to swing in a horizontal plane about its vertical axis when the boom meets with an obstruction, said spraying apparatus including flexible conduit means independent of the connections between the boom and the carrier vehicle for connecting the spray pipe with the liquid spray supply means.

19. An ambulant tree spraying apparatus comprising a carrier vehicle, an elongated horizontal spray boom mounted at one end for extension laterally from the vehicle and to swing longitudinally of the vehicle about a vertical axis, a stay extending from the boom at or near the free end of the boom toward a portion of the vehicle forward of the boom, a keeper on the vehicle, and a yielding spring held latch connection between the stay and keeper normally operating to hold the boom in laterally extending position and automatically disengageable from the keeper under stress on the stay when the boom meets with an obstruction to release the stay to permit the boom to swing about its vertical axis.

20. An ambulant tree spraying apparatus comprising a carrier vehicle, an elongated horizontal spray boom, means mounting the boom at one end for extension laterally of the vehicle and to swing longitudinally and slide vertically about a vertical axis and to swing to a raised vertical position about a horizontal axis, said means comprising a bracket on the vehicle, a sleeve carried by the bracket, and a post slidable and rotatable in the sleeve and to which the boom is pivoted to swing about its horizontal axis, coacting means carried by the boom and post for holding the boom in raised position, and releasable retaining means for normally holding the boom in laterally extending position while permitting the same to slide on its vertical axis and to swing on its horizontal axis and operative to release the boom to swing in a horizontal plane about its vertical axis when the boom meets with an obstruction.

21. For use with an ambulant tree spraying apparatus comprising a carrier vehicle, and an elongated horizontal spray boom mounted at one end for extension laterally from the vehicle and to swing longitudinally of the vehicle about a vertical axis; automatically releasable retaining means for normally holding the boom in laterally extending position and operative under stress on the boom when the boom meets with an obstruction to permit the boom to swing about its vertical axis, said means comprising a stay connected with the boom, an arm pivotally connected with the vehicle to swing outward laterally therefrom, means for yieldingly resisting the outward movement of the arm, a keeper on the vehicle, a spring projected latch bolt on the arm to engage said keeper, and a cam mounted on the vehicle and connected to the stay and operating by a predetermined pull thereon to retract the latch bolt.

22. For use with an ambulant tree spraying apparatus comprising a carrier vehicle, and an elongated horizontal spray boom mounted at one end for extension laterally from the vehicle and to swing longitudinally of the vehicle about a vertical axis; a stay extending from the boom at or near the free end of the boom toward a portion of the vehicle forward of the boom, a keeper on the vehicle, and a yielding spring held connection between the stay and vehicle including a bolt to engage the latch and a cam member connected to the stay for retracting the latch, said connection normally operating to hold the boom in laterally extending position and operative under stress on the stay when the boom meets with an obstruction to actuate the cam to effect the release of the latch and stay to permit the boom to swing about its vertical axis.

23. For use with an ambulant tree spraying apparatus comprising a carrier vehicle, and an elongated horizontal spray boom mounted at one end for extension laterally of the vehicle to swing longitudinally; releasable retaining means for normally holding the boom in laterally extending position while permitting the same to slide on its vertical axis and to swing on its horizontal axis and operative to release the boom to swing in a horizontal plane about its vertical axis when the boom meets with an obstruction, said means comprising a keeper on the vehicle, a latch on the vehicle to engage the keeper, a cam on the vehicle for retracting the latch, and a stay connection between the boom and cam operative by a predetermined pull thereon to actuate the cam.

24. An ambulant tree spraying apparatus comprising a carrier vehicle, an elongated horizontal spray boom mounted at one end for extension laterally from the vehicle and to swing longitudinally of the vehicle about a vertical axis, and automatically releasable retaining means for normally holding the boom in laterally extending position and operative under stress on the boom when the boom meets with an obstruction to permit the boom to swing about its vertical axis, said means comprising a gravity closing pivoted keeper on the vehicle, a laterally swinging arm on the vehicle, a spring for resisting outward swinging movement of the arm, a spring actuated bolt on the arm slidably movable normally to engage the keeper and to release the arm therefrom and movable to open the keeper for gravity closing movement in engagement when the arm after outward movement is returned to normal position, and means connected with the keeper to open the same and release the bolt.

25. An ambulant tree spraying apparatus comprising a carrier vehicle, an elongated horizontal spray boom, means mounting the boom at one end for extension laterally from the vehicle and to swing longitudinally of the vehicle about a vertical axis, said means including a sleeve on the vehicle and a post journaled in the sleeve and coupled to the boom, a stay extending from the boom at or near the free end of the boom toward a portion of the vehicle forward of the boom, and a yielding spring-held connection between the stay and vehicle normally operating to hold the boom in laterally extending position and operative under stress on the stay when the boom meets with an obstruction to release the stay to permit the boom to swing longitudinally through rotation of the post in the sleeve.

26. An ambulant tree spraying apparatus comprising a carrier vehicle, an elongated horizontal spray boom, means mounting the boom at one end for extension laterally of the vehicle to swing longitudinally and slide vertically about a vertical axis and to swing to a raised vertical position about a horizontal axis, said means comprising a fixed sleeve on the vehicle and a post rotatably and slidably mounted in the sleeve and to which the boom is pivoted to swing about a horizontal axis, means connecting the boom when swung upwardly on its horizontal axis to hold the boom in raised position, and releasable retaining means for normally holding the boom in laterally extending position while permitting the same to slide vertically and to swing on its horizontal axis and operative to release the boom to swing in a horizontal plane about its vertical axis when the boom meets with an obstruction.

27. An ambulant tree spraying apparatus comprising a carrier vehicle, an elongated horizontal spray boom mounted at one end for extension laterally of the vehicle and to swing longitudinally of the vehicle about a vertical axis, and releasable retaining means for normally connecting the boom with the vehicle to hold the boom in laterally extending position and operative under stress on the boom when the boom meets with an obstruction to permit the boom to swing about its vertical axis, said means comprising a keeper on the vehicle, a member pivotally mounted on the vehicle to swing laterally therefrom, a spring-actuated latch carried by said member to engage the keeper, means for connecting the stay with said member and retracting the latch and swinging the member outwardly under a pull of a prescribed force on the stay, a return spring for retracting the latch carrrying member, and means for regulating the action of said spring.

28. An ambulant tree spraying apparatus comprising a carrier vehicle, an elongated horizontal spray boom mounted at one end for extension laterally from the vehicle and to swing longitudinally of the vehicle about a vertical axis, a keeper on the vehicle, a stay extending from the boom at or near the free end of the boom toward a portion of the vehicle forward of the boom, and a yielding spring held connection between the stay and vehicle comprising a latch device for engagement with the keeper to normally hold the boom in laterally extending position, said latch device being releasable from the keeper and movable outward laterally from the vehicle under stress on the stay when the boom meets with an obstruction to release the stay to permit the boom to swing about its vertical axis, a spring for resisting the outward movement of the latch device and returning it to normal position when such stress is removed from the cable, and means for regulating the action of said spring.

29. A spraying apparatus including, in combination, a carrier vehicle, an elongated spray boom arranged horizontally and extending laterally at one side of the vehicle, a second spray boom arranged vertically on the vehicle, said horizontal boom comprising a shield provided with a spray discharge opening, a spray pipe guarded by the shield and extending lengthwise thereof, and a longitudinal series of spaced nozzles on the spray pipe arranged for discharge of spray therefrom through the opening in its shield, said horizontal spray pipe being mounted to swing the nozzles thereof from side to side of the opening in its shield, means for actuating said horizontal pipe to effect such swinging movement, and means for supplying spraying liquid to said pipes.

30. A spraying apparatus including in combination, a carrier vehicle having a source of spray solution, a channeled shield supported by the carrier vehicle for travel therewith, said shield having a spray discharge opening at its top, a spray pipe communicating with said source of supply of solution and longitudinally disposed within the shield, means controlling the supply of solution from the source to the pipe, means mounting the shield and pipe on the vehicle with freedom for vertical movements bodily with relation to the surface of the ground, and means for imparting motion to the nozzles to swing the same in an arc in a general direction toward and between the walls of the shield opening.

31. A spraying apparatus including, in combination, a carrier vehicle, a spray boom arranged horizontally and extending lengthwise laterally at one side of the vehicle for travel in contact with the ground, said boom comprising a shield and a spray pipe provided with a longitudinal series of nozzles arranged for discharge of spray upward from the pipe, means for swinging said nozzles in unison, a bracket mounted on the frame of the vehicle, and supporting means for the boom having sliding engagement with the bracket to adapt the boom to have up and down movements in its travel over irregular ground surfaces.

32. A tree spraying apparatus comprising a traveling vehicle, a horizontal spray pipe extending lengthwise from one side of the vehicle for travel therewith and along or in close proximity to the ground, a longitudinal series of nozzles projecting upwardly from said pipe for discharging spray against the limbs of trees beneath which the pipe travels, means for swinging said nozzles in unison, a shield arranged in advance of the nozzles for guarding the same against injury by obstructions, means pivotally mounting the pipe at its inner end on the vehicle for swinging movements longitudinally of the vehicle and recession from its normal working position, a stay connection between the vehicle and pipe for normally holding the latter in its normal working position, and means for releasing the stay connection when an obstruction to the travel of the boom is encountered thereby.

33. An ambulant tree spraying apparatus comprising a carrier vehicle, an elongated horizontal spray boom extending laterally from the rear of the vehicle at substantially ground level, said carrier vehicle including a rear cross member, and said spray boom being adjustably mounted on said cross member to permit adjustments for varying tree widths.

34. An ambulant tree spraying apparatus comprising a carrier vehicle, an elongated horizontal spray boom extending laterally from a portion of the vehicle at substantially ground level and comprising a longitudinally extending spray pipe having upwardly projecting nozzles and a guard shield extending lengthwise of the pipe in front of the nozzles, means connecting the inner end of said spray boom to the vehicle to permit the boom to swing in a horizontal arc longitudinally of the vehicle, and releasable stay means extending in a substantially horizontal plane from the outer portion of the boom to a portion of the vehicle in advance of the point of attachment of the inner end of the boom, said stay means serving to normally hold the boom in laterally extending position and also serving as a sweep to push aside tall grass and the like in advance of the boom to prevent interference with the free discharge of spray from the spray pipe.

35. An ambulant tree spraying apparatus comprising a carrier vehicle, a liquid storage tank carried by the vehicle, an elongated under tree spray boom, carried by the vehicle and normally extending laterally therefrom at substantially ground level, means for connecting the boom at its inner end to the carrier vehicle to permit swinging movement in a horizontal arc longitudinally of the vehicle, said boom comprising a spray pipe extending longitudinally thereof and having upwardly projecting spray nozzles, and a guard shield extending lengthwise of the pipe in front of the nozzles, conduit connections between said tank and spray pipe whereby spray liquid may be supplied to the spray pipe, said conduit connections being independent of the means connecting the boom with the carrier vehicle and including a flexible section, and releasable flexible stay means comprising a cable or the like extending angularly from the outer portion of the boom in a substantially horizontal plane to a portion of the carrier vehicle in advance of the point of attachment of the spray boom and at substantially the same level as the boom, said stay means serving to normally hold the boom in laterally extending position and also serving as a sweep to push aside tall grass and the like in advance of the boom as the vehicle is moved forwardly to prevent interference with the free discharge of spray from the spray pipe.

36. An ambulant tree spraying apparatus comprising a carrier vehicle, a liquid storage tank carried by the vehicle, an elongated under tree spray boom carried by the vehicle and normally extending laterally therefrom at substantially ground level, means for connecting the boom at its inner end to the carrier vehicle to permit swinging movement in a horizontal arc longitudinally of the vehicle, said boom comprising a longitudinally extending spray pipe having upwardly directed spray nozzles and a shield extending lengthwise of the pipe in front of the nozzles, connections between said tank and spray pipe whereby spray liquid may be supplied to the spray pipe, and releasable flexible stay means comprising a cable or the like extending angularly from the outer portion of the boom in a substantially horizontal plane to a portion of the carrier vehicle in advance of the point of attachment of the spray boom and at substantially the same level as the boom, said stay means serving to normally hold the boom in lateral extending position and also serving as a sweep to push aside tall grass and the like in advance of the boom as the vehicle is moved forwardly to prevent interference with the free discharge of spray from the spray nozzles.

37. An ambulant tree spraying apparatus comprising a carrier vehicle, a spray boom carried thereby and normally extending laterally therefrom, and having connections therewith permitting swinging movement in vertical and horizontal planes as well as bodily vertical sliding movement relative to the carrier vehicle, said connection including an upright sleeve rigidly carried by the vehicle, a post vertically slidable and rotatable therein, and stirrup means rigidly connected with one end of the boom and hinged to the lower end of the post about a horizontal pivot, whereby the boom may be swung upwardly to operative position, means for locking the post to the sleeve to prevent relative rotation when the boom is in its raised inoperative position, and means for securing a portion of the boom to the post to retain the boom in raised vertical position.

38. In an ambulant tree spraying apparatus comprising a carrier vehicle and an elongated horizontal under tree spray boom extending laterally therefrom at substantially ground level, said boom comprising a spray pipe shield having a spray discharge opening at the upper portion thereof, a spray pipe mounted within the shield and extending longitudinally thereof having nozzles projecting upwardly therefrom and adapted to discharge spray liquid through the opening in the shield, and means for swinging the nozzles in unison to vary their angular relation to the discharge opening.

39. An ambulant tree spraying apparatus comprising a carrier vehicle, an elongated horizontal spray boom mounted at one end for extension laterally from the vehicle and to swing longitudinally of the vehicle about a vertical axis, and automatically releasable retaining means for normally holding the boom in laterally extending position and operative under stress on the boom when the boom meets with an obstruction to permit the boom to swing about its vertical axis, said means comprising a gravity closing pivoted keeper on the vehicle, a laterally swinging arm on the vehicle, a spring for resisting outward swinging movement of the arm, a spring actuated bolt on the arm slidably movable normally to engage the keeper and to release the arm therefrom and movable to open the keeper for gravity closing movement in engagement when the arm after outward movement is returned to normal position.

40. An ambulant tree spraying apparatus comprising a carrier vehicle, a liquid storage tank carried by the vehicle, an elongated under tree spray boom carried by the vehicle and normally extending laterally therefrom at substantially ground level, means for connecting the boom at its inner end to the carrier vehicle to permit swinging movement in a horizontal arc longitudinally of the vehicle, said boom comprising a longitudinally extending spray pipe having upwardly directed spray nozzles and a shield extending lengthwise of the pipe in front of the nozzles, connections between said tank and spray pipe whereby spray liquid may be supplied to the spray pipe, and flexible stay means extending angularly from the outer portion of the boom in a substantially horizontal plane to a portion of the carrier vehicle in advance of the point of attachment of the spray boom and at substantially the same level as the boom, said stay means serving to normally hold the boom in lateral extending position and also serving as a sweep to push aside tall grass and the like in advance of the boom as the vehicle is moved forwardly to prevent interference with the free discharge of spray from the spray nozzles.

References Cited in the file of this patent

UNITED STATES PATENTS

| Number | Name | Date |
|---|---|---|
| 304,024 | Phare | Aug. 26, 1884 |
| 464,603 | Hampton et al. | Dec. 8, 1891 |
| 910,400 | Lischer | Jan. 19, 1909 |
| 978,083 | Wallace | Dec. 6, 1910 |
| 1,275,599 | Reed | Aug. 13, 1918 |
| 1,399,229 | Servoss | Dec. 6, 1921 |
| 1,470,246 | Willis et al. | Oct. 9, 1923 |
| 1,629,160 | Heermance | May 17, 1927 |
| 1,752,619 | Summerfeld | Apr. 1, 1930 |
| 1,786,314 | Passmel | Dec. 23, 1930 |
| 1,900,837 | Mills | Mar. 7, 1933 |
| 1,953,394 | Clapper | Apr. 3, 1934 |
| 1,974,166 | Thompson et al. | Sept. 18, 1934 |
| 2,132,727 | Foote | Oct. 11, 1938 |
| 2,297,110 | Parker | Sept. 29, 1942 |
| 2,305,913 | Troyer | Dec. 22, 1942 |
| 2,365,755 | Griffith | Dec. 26, 1944 |

FOREIGN PATENTS

| Number | Country | Date |
|---|---|---|
| 16,150 | Great Britain | July 7, 1897 |
| 37,954 | Denmark | Sept. 7, 1927 |
| 459,155 | France | Aug. 28, 1913 |
| 767,240 | France | Mar. 1, 1934 |